United States Patent [19]

Hettinger, Jr. et al.

[11] 4,450,241
[45] May 22, 1984

[54] ENDOTHERMIC REMOVAL OF COKE DEPOSITED ON CATALYTIC MATERIALS DURING CARBO-METALLIC OIL CONVERSION

[75] Inventors: William P. Hettinger, Jr., Russell; Stephen M. Kovach, Ashland, both of Ky.; James F. Hoffman, Huntington, W. Va.

[73] Assignee: Ashland Oil, Inc., Ashland, Ky.

[21] Appl. No.: 418,880

[22] Filed: Aug. 16, 1982

Related U.S. Application Data

[62] Division of Ser. No. 290,277, Aug. 5, 1981.

[51] Int. Cl.³ .................. B01J 29/38; B01J 21/20; C10G 11/05; C10G 11/04
[52] U.S. Cl. .................. 502/34; 48/197 R; 208/113; 208/120; 208/164; 502/39; 502/41; 502/50
[58] Field of Search .............. 252/411 R, 411 S, 417, 252/419, 420; 502/34, 39, 41, 50

[56] References Cited

U.S. PATENT DOCUMENTS

| | | | |
|---|---|---|---|
| 2,465,255 | 3/1949 | Moorman | 252/417 |
| 2,647,042 | 7/1953 | Mills | 208/150 |
| 2,905,622 | 9/1959 | McCarthy | 252/411 R |
| 3,013,985 | 12/1961 | Reeck et al. | 252/455 Z |
| 3,696,025 | 10/1972 | Chessmore et al. | 252/417 |
| 3,835,032 | 9/1974 | Dolbear et al. | 252/455 Z |
| 3,929,621 | 12/1975 | Lussier et al. | 208/120 |
| 4,098,677 | 7/1978 | Waghorne | 252/417 |
| 4,253,989 | 3/1981 | Lim et al. | 252/455 Z |
| 4,316,794 | 2/1982 | Schoennagel | 208/120 |
| 4,325,814 | 4/1982 | Gross | 252/417 |
| 4,325,817 | 4/1982 | Bartholic et al. | 252/417 |
| 4,376,696 | 3/1983 | Myers | 252/416 |
| 4,377,470 | 3/1983 | Hettinger, Jr. et al. | 208/120 |
| 4,388,218 | 6/1983 | Rowe | 252/417 |

FOREIGN PATENT DOCUMENTS 2001545A  2/1979  United Kingdom ............... 252/419

Primary Examiner—P. E. Konopka
Attorney, Agent, or Firm—Richard C. Willson, Jr.; Richard L. Kelly; Stanley M. Welsh

[57] ABSTRACT

A process is disclosed for the conversion of high boiling oil feeds having a significant level of Conradson carbon components and metals to form lighter oil products by contacting the feed under catalytic conversion conditions with a catalyst containing one of a select group of metal additives to catalyze the endothermic removal of carbon with $CO_2$. Conversion conditions are such that hydrocarbonaceous material and metals are deposited to deactivate the catalyst in the conversion zone. Deactivated catalyst is partially regenerated in the presence of carbon dioxide containing gas before or after oxygen regeneration at a temperature below 1600° F. to provide a regenerated catalyst which is recycled to the conversion zone for further contact with fresh feed. The metal additive is present on the catalyst in an amount sufficient to catalyze the endothermic removal of carbonaceous material in the presence of a carbon dioxide rich gas at regeneration temperature below 1500° F. The catalyst composition comprises a crystalline aluminosilicate dispersed in a solid matrix material and containing one or more of the metal additives. Metal additive may be introduced into the catalyst during the conversion process or during catalyst manufacture. Metal additives include water soluble inorganic metal salts, hydrocarbon soluble organo-metallic compounds of the select group of metals, and metal contaminants found in a high boiling residual oil feed.

14 Claims, 6 Drawing Figures

ENDOTHERMIC REMOVAL OF COKE DEPOSITED ON CATALYTIC MATERIALS DURING CARBO-METALLIC OIL CONVERSION

This application is a division of application Ser. No. 290277, filed Aug. 5, 1981.

This invention relates to an improved catalyst composition and use thereof for effecting the conversion of 650° F.+ hydrocarbons comprising metal contaminants to liquid transportation and/or heating fuels. In one aspect the invention is related to a catalyst composition comprising a catalytically active crystalline aluminosilicate or zeolite dispersed within a matrix material with one or more select metal additives as a free metal, their oxides or their salts which will catalyze the endothermic removal of carbon or carbonaceous deposits on the catalyst with carbon dioxide. The one or more metal additives suitable for catalyzing carbon removal may be added during any one or a combination of catalyst manufacture, after manufacture by impregnation of virgin catalyst, or at any point in the catalyst cycle for conversion of the oil feed and regeneration of catalyst employed.

After the introduction of zeolitic containing cracking catalysts, the petroleum refining industry lacked crude availability as to quantity and quality accompanied by a high demand for gasoline of reasonably high octane values. The world crude supply picture changed dramatically in the late 1960's and early 1970's. From a surplus of light, sweet crudes the supply situation changed to a tighter supply with an ever increasing amount of heavier crudes with higher sulfur contents. These heavier and higher sulfur crudes presented processing problems to the petroleum refiner in that these heavier crudes invariably also contained much higher metals and Conradson carbon values, with accompanying significantly increased asphaltic content.

Fractionation of the total crude to yield cat cracker gas oil charge stocks also required much better control to ensure that metals and Conradson carbon values were not carried overhead to contaminate the FCC charge stock.

The effects of heavy metals and Conradson carbon on a zeolite containing FCC catalyst have been described in the literature as to their highly unfavorable effect on lowering catalyst activity and selectivity for gasoline and light fuel oil production and their equally harmful effect on catalyst life.

These heavier crude oils also contained more of the heavier fractions and yield less or a lower volume of a high quality gas oil FCC charge stock which normally boils below about 1025° F. Such feeds are usually processed, so as to contain a total metals level below 1 ppm, preferably below 0.1 ppm, and Conradson carbon values substantially below 1.0.

With the need to process the ever increasing supply of the heavier less desirable crudes, which provide lowered yields of gasoline, and the increasing demand for liquid transportation fuels, the petroleum industry began a search for processing schemes to utilize their heavier crudes in producing gasoline. Many of these processing schemes have been described in the literature. These include Gulf's Gulfining and Union Oil's Unifining processes for treating residium, UOP's Aurabon process, Hydrocarbon Research's H-Oil process, Exxon's Flexicoking process to produce thermal gasoline and coke, H-Oil's Dynacracking and Phillip's Heavy Oil Cracking (HOC) processes. These processes utilize thermal cracking, hydrotreating followed by FCC and hydrocracking operations to handle the higher boiling crude oil fractions comprising metal contaminants (Ni-V-Fe-Cu-Na) and comprise high Conradson carbon values in the range of 5–15. Some of the drawbacks of these types of processes are as follows: coking yields thermally cracked gasoline which has a much lower octane value than cat cracked gasoline, is unstable due to the production of gum from diolefins and requires further hydrotreating and reforming to produce a high octane product; gas oil quality is degraded due to thermal reactions which produce a product containing refractory polynuclear aromatics and high Conradson carbon levels which are highly unsuitable for catalytic cracking; and hydrotreating requires expensive high pressure hydrogen, multi-reactor systems made of special alloys, costly operations, and a separate costly facility for the production of hydrogen.

To better understand the reasons why the industry has progressed along the processing schemes described, one must understand the known and established effects of contaminant metals (Ni-V-Fe-Cu-Na) and Conradson carbon on zeolite cracking catalysts and the operating parameters of a fluid catalytic cracking system. Metal content and Conradson carbon are two very effective restraints on the operation of a gas oil FCC unit and may even impose some undesirable restraints on a Reduced Crude Conversion (RCC) unit charging a higher boiling feed of higher metals and Conradson carbon from the standpoint of obtaining maximum conversion, selectivity and catalyst life. Relatively low levels of these contaminants are highly detrimental to a FCC unit. As metals and Conradson carbon levels are increased, the operating capacity and efficiency of a reduced crude cracking (RCC) unit may be adversely affected or even made uneconomical. These adverse effects occur even though there is enough hydrogen in the feed to produce an ideal gasoline consisting of only toluene and isometric pentenes (assuming a catalyst with such ideal selectivity could be devised).

The effect of increased Conradson carbon in a high boiling hydrocarbon feed is to increase that portion of the feedstock converted to coke and deposited on the catalyst. In typical gas oil operations employing a fluid zeolite cracking catalyst, the amount of coke deposited on the catalyst averages around about 4–5 wt% of the feed. This coke production has been attributed to four different coking mechanisms, namely, contaminant coke from adverse reactions caused by metal deposits, catalytic coke caused by acid site cracking, entrained hydrocarbons resulting from pore structure adsorption and/or poor stripping, and Conradson carbon resulting from pyrolytic distillation of hydrocarbons in the conversion zone. There has been postulated two other sources of coke present in reduced crudes in addition to the four present in gas oils. They are: (1) adsorbed and absorbed high boiling hydrocarbons which do not vaporize and cannot be removed by normally efficient stripping, and (2) high molecular weight nitrogen containing hydrocarbons compounds adsorbed on the catalyst's acid sites. Both of these two new types of coke producing phenomena add greatly to the complexity of resid processing. Therefore, in the processing of higher boiling fractions, e.g., reduced crudes, residual fractions, topped crude, and the like, the coke production based on feed is the summation of the four types present in gas oil processing, plus coke from the higher boiling unstrippable hydrocarbons and coke associated with the high boiling nitrogen containing molecules which are adsorbed on the catalyst. Coke production on clean catalyst, when processing reduced crudes, may be estimated as approximately 4 wt% of the feed plus the Conradson carbon value of the heavy feedstock.

The coked catalyst is brought back to equilibrium activity by burning off the deactivating coke in a regeneration zone in the presence of air and the regenerated catalyst is recycled back to the reaction zone. The heat generated during regeneration is removed in part by regeneration flue gas and in part by the catalyst carried to the reaction zone to effect vaporization of the feed and to provide heat for the endothermic cracking reaction. The temperature in the regenerator is normally limited below 1500° F. because of metallurgical limitations and the hydrothermal stability of the catalyst.

The hydrothermal stability of a zeolite containing catalyst is determined by the temperature and steam partial pressure at which the zeolite begins to rapidly lose its crystalline structure to yield a lower activity amorphous material. The presence of steam in the regenerator is highly critical and is generated by the burning of adsorbed and absorbed (sorbed) hydrocarbonaceous material which has a significant hydrogen content (hdrogen to carbon atomic ratios generally greater than about 0.5). This hydrocarbonaceous material deposit is a residual of high boiling sorbed hydrocarbons. Residual oils and reduced crudes comprise materials which do not vaporize below 1025° F. but comprise materials with boiling points as high as 1500°-1700° F. or above that have a very modest hydrogen content. These materials include the high boiling high molecular weight nitrogen containing hydrocarbons, as well as related porphyrins and asphaltenes. The high molecular weight nitrogen compounds usually boil above 1025° F. and may be either basic or acidic in nature. The basic nitrogen compounds may neutralize acid sites while those that are more acidic may be attracted to metal sites on the catalyst. The porphyrins and asphaltenes also generally boil above 1025° F. and may contain elements other than carbon and hydrogen. As used in this specification, the term "heavy hydrocarbons" includes all carbon and hydrogen compounds that do not boil or vaporize below about 1025° F., regardless of whether other elements are also present in the compound.

The heavy metals in the feed are generally present as porphyrins and/or asphaltenes. However, certain of these metals, particularly iron and copper, may be present as the free metal or as inorganic compounds resulting from either corrosion of process equipment or contaminants from other refining processes.

As the Conradson carbon value of the feedstock increases, coke production necessarily increases and this increased load will raise the regeneration temperature; thus the conversion unit may be limited as to the amount of feed that can be processed, because of its Conradson carbon content. Earlier gas oil cracking units operated with a regenerator temperature in the range of 1150°-1350° F. but are feed quality and volume limited.

The high boiling portion of a crude oil identified as a residual oil or a reduced crude contain metals (Ni-V-Fe-Cu) in the form of porphyrins and asphaltenes. These metal containing hydrocarbons (porphyrins and asphaltenes) are deposited on a catalyst during a cracking processing with hydrocarbonaceous material and are carried over by the catalyst to the regenerator and converted to the metal oxide during high temperature regeneration. The adverse effects of these metals as taught in the literature are to cause non-selective or degradative cracking and dehydrogenation to produce increased amounts of coke and light gases such as hydrogen, methane and ethane. These mechanisms adversely affect catalyst selectivity, resulting in poor yields and poor quality of gasoline and light cycle oil. The increased production of light gases, while impairing the liquid yield and selectivity of the process, also puts an increased demand on a refinery gas compressor capacity in the gas plant. The increase in coke production, in addition to its negative impact on yield, also adversely affects catalyst activity-selectivity, greatly increases regenerator air demand and compressor capacity, and may result in uncontrollable and/or dangerous regenerator temperatures.

THE INVENTION

This invention is concerned with an improved catalyst and its method of use for effecting the catalytic conversion of high boiling petroleum oil feeds such as a residual oil portion of crude oil and fractions thereof containing significant levels of Conradson carbon (at least about 6.0 wt%) and high metals level. More particularly, the invention is concerned with the use of a select group of metal additives provided with the catalyst which will reduce the deactivation of catalytically active sites of a crystalline alumino-silicate zeolite associated therewith during regeneration. More particularly, the metal additives are relied upon to reduce temperatures encountered and high temperature steam deactivating effects in a catalyst regenerator. Burning the high Conradson carbon contaminants deposited by feeds substantially raises regeneration temperatures and which will exceed 1600° F. The invention is particularly useful in the processing of relatively high boiling hydrocarbons comprising carbo-metallic oil containing components in a reduced crude catalytic cracking operation and effecting regeneration of the catalyst used therein so that excessive undesired temperatures can be avoided.

In yet another aspect, the present invention is concerned with promoting the endothermic reaction of $CO_2$ with carbon to produce CO. Thus a $CO_2$ rich gas is relied upon for regenerating a catalyst comprising high levels of deposited hydrocarbonaceous material at temperatures below 1600° F. and more usually in the range of 1350° F. up to about 1500° F.

It has long been known that reduced crudes comprising Conradson carbon values present serious processing problems as to catalyst deactivation and unit metallurgy problems at high or elevated regenerator temperatures. The rapid loss of catalyst activity and selectivity manifests itself as a loss of zeolitic structure due in part to high temperature steam in the regenerator. The loss of crystalline zeolitic structure and pore structure due to sintering also becomes more rapid and severe with high regeneration temperatures due to relatively high Conradson carbon deposits on the catalyst.

Prior to the present invention, it was believed impractical to operate catalytic cracking processes economically at Conradson carbon values higher than 8 wt% because of the above phenonmenon. Previously, catalyst deactivation at these high levels of coke has been difficult to retard even by lowering regenerator temperatures, maintaining large catalyst inventory and retaining a high residual carbon on regenerated catalyst.

These solutions do not solve the problem because even longer burn times or large inventories do not make for an efficient operation. Furthermore, it will lead to catalyst deactivation because of the long hydro-thermal contact time of the catalyst in the presence of steam at high temperatures in the regenerator and high residual carbon on regenerated catalyst is also not satisfactory since it yields a catalyst of lower activity and selectivity which requires a higher catalyst to oil ratio at constant conversion which means more coke or hydrocarbonaceous material charged to the regenerator.

Some crude oils and some FCC gas oil charge stocks obtained by the distillation of crude oils contain significant amounts (greater than 0.1 ppm) of heavy metals such as Ni, V, Fe, Cu, Na and provide Conradson carbon values of 0.5 wt% or greater. On the other hand, residual oil fractions comprising vacuum distillation products have much greater amounts of the heavy metals and also Conradson carbon values contributed by porphyrins, asphaltenes and polycyclic naphthenes. By means of the present invention, these high boiling residual oils or reduced crudes are converted to liquid fuels such as transportation fuels and distillate heating fuels by contact with a special catalyst composition comprising a crystalline zeolitic cracking catalyst containing one or more metal additives herein identified which will immobilize vanadium and catalyze an endothermic removal of carbon deposited on the catalyst with $CO_2$.

It has been found that high levels of Conradson carbon in carbo-metallic containing oils and comprising components not boiling below 1025° F. to determine the limit of processability of such carbo-metallic oils and can lead to very high regenerator temperatures that are considered detrimental to catalyst activity. As stated earlier the coke or carbonaceous material deposited on a catalyst during catalytic operations is a function of six types of coke producing materials present in the hydrocarbon feed and can be estimated by the formula of 4 wt% plus the Conradson carbon content of the feed as wt% coke on feed. An additional correction to be added is that related to the basic nitrogen content of the feed. The limit of Conradson carbon (CRC) that can be tolerated in present day cracking processes is about 8 wt%. However, it is contemplated processing a much higher Conradson carbon producing material up to 12 or more wt% based on using a residual oil or reduced crude as feed in the cracking process of this invention.

Several approaches are available for upgrading reduced crudes with Conradson carbon values appreciably greater than 8 wt%. These include hydrotreating, hydrocracking, coking, visbreaking with and without the presence of added molecular hydrogen and deasphalting or other Conradson carbon removal processes. The drawbacks to these types of processes are numerous. For example, hydrotreating and hydrocracking are costly, relying on high pressure reactors for hydrocracking, obtaining costly hydrogen, providing a satisfactory catalyst and the need for high pressure compressors and separation equipment. Coking and visbreaking provide low grade products of relatively poor yields which is undesirable in view of present day crude costs. Also the olefin-diolefin ratio of the product and gasoline product require further treating since the product cycle oil is unstable and of low grade, high in sulfur and coke forming materials. Asphalt removal operations require solvent extraction systems with solvent recovery, vacuum distillation and produce a rather poor quality feed stock for use in conventional fluid catalytic cracking operations. In addition a bottoms or extract fraction is recovered which must be disposed of in bunker fuels or blended with some light oil to make a fuel oil or asphalt specifications.

As the Conradson carbon value of the reduced crude or carbo-metallic containing feed increases past 8 wt%, the coke load to the regenerator in the form of hydrocarbonaceous material is great enough to raise the regenerator temperature above 1400° F. and can more usually bring the temperature up to 1500°–1600° F. or more at the higher Conradson carbon values. To compensate for this, coolers in the regenerators and/or water addition to the regenerators has been suggested by the prior art. The two main reactions encountered in the combustion of hydrocarbonaceous material on a spent cracking catalyst with oxygen are the conversion of carbon to carbon oxides and hydrogen to water. The hydrocarbonaceous material comprises about 90 to 95% by weight carbon and about 5 to 8 wt% hydrogen. Sulfur and nitrogen are also present depending on feed source.

By employing a regeneration scheme in which a portion of the carbon is removed under endothermic reaction conditions, then the regenerator temperature can be more easily limited or controlled below 1600° F. and preferably limited not to exceed about 1500° F. This lower temperature operation is particularly desirable for reducing catalyst deactivation as well as for metallurgical reasons, and more particularly, feedstocks possessing high Conradson carbon values above 8 wt% up to 20 or more wt% can be processed without encountering undesired high temperatures along with steam deactivation of the catalyst.

The present invention is concerned with a new and improved technique for removing high levels of hydrocarbonaceous material from catalyst particles employed during catalytic conversion of residual oil fractions of high Conradson carbon value. The improved regeneration technique of this invention is based in substantial measure upon use of an improved catalyst composition comprising one or more metal additions from a select group of metals in combination with a high activity crystalline zeolite containing cracking catalyst. More particularly, the improved regeneration technique of this invention is concerned with effecting oxidative partial removal of carbonaceous material from spent catalyst and endothermic removal of residual carbon with $CO_2$ in the presence of a metal additive promoting the reaction. The Boudouard reaction concerned with the reaction of carbon with carbon dioxide to yield carbon-monoxide is known to be feasible at elevated temperatures and pressures. However, these elevated temperatures and pressures are above the normal operating limits of a regenerator operation used in fluid catalysts cracking operations. However, as discussed herein, the addition of one or more metals from a select group of metal additives to the catalyst will substantially increase the rate of conversion of carbon with carbon dioxide to yield carbon monoxide at much lower regeneration temperatures, in the range of about 1350° F. up to preferably about 1400° F. to about 1500° F. Such temperature limits are within acceptable operating limits of a catalyst regeneration operation. The select metal additives identified by this invention catalyze the reaction of carbon dioxide (which can be obtained as flue gas from a FCC or RCC regeneration operation) with carbon to yield carbon monoxide which can be recovered and converted in a downstream CO boiler to CO$_2$. The reaction of CO$_2$ with carbon is an endothermic reaction, thus the reaction will considerably lower the heat released in a normal regeneration operation over that obtained by the combustion of carbon with oxygen alone to form carbon oxides.

The endothermic reaction of carbon with carbon dioxide to form carbon monoxide is desirable since the combustion of carbon with oxygen to form carbon monoxide only releases 40% of the heat of that released by combusting carbon monoxide with oxygen to form carbon dioxide. Secondly, the conversion of hydrogen present in the hydrocarbonaceous material to form water through combustion with an oxygen containing gas is even a more highly exothermic reaction than the combustion of carbon to carbon oxides.

The select metal additives identified by this invention were chosen to particularly catalyze the endothermic removal of carbon with CO$_2$ from a catalyst comprising residual carbon and/or hydrocarbonaceous material. These identified additive metals catalyze the reaction of carbon as well as hydrogen when present with carbon dioxide to yield carbon monoxide and water at a rate sufficient to remove up to about 40 wt% or greater of the carbon as an endothermic reaction. This method of coke removal permits the operation of a fluid (FCC-RCC) catalyst regenerator within temperature and steam partial pressure constraints that do not lead to excessive catalyst deactivation and more importantly, one can thus process high boiling hydrocarbon compositions comprising asphaltenes found in reduced crudes, topped crudes, and carbo-metallic containing oils with Conradson carbon values above 8 wt% and up to as high as 20 wt%.

The method of addition of the metal additive to the cracking catalyst composition can be during catalyst manufacture or at any point in the catalyst processing cycle of hydrocarbon conversion, catalyst stripping and catalyst regeneration. Addition during manufacture may be made either to the catalyst slurry before particle formation or by impregnation after catalyst particle formation, such as after spray drying of the catalyst slurry to form microspheres. It is to be understood that the catalyst particles can be of any particle size suitable for hydrocarbon conversion and appropriate for a fluid or dense moving bed conversion process in which the catalyst is to be employed. Thus, while a fluidizable particle size is particularly contemplated, the metal additives may be employed with larger size particles, such as those greater than 200 micron particle size used for a moving catalyst bed system in contact with unvaporized hydrocarbon feeds.

Problems caused by hydrocarbon feeds comprising high Conradson carbon containing contaminants which are deposited on a cracking catalyst are overcome in substantial measure by employing a catalyst composition promoted with a select metal additive herein identified and used according to this invention. Although some FCC operations may employ the concepts of this invention to some considerable advantage, the concepts are especially effective in the processing of high boiling hydrocarbon feeds comprising reduced crudes, residual oil, topped crudes and other carbo-metallic containing feeds comprising metal contaminants of high vanadium to nickel ratios and high Conradson carbon values. Thus RCC feed type feed materials comprising relatively high levels of metal contaminants and Conradson carbon values are preferably contacted within restricted temperature-contact time parameters in a riser contact zone with a fluidizable crystalline zeolite containing cracking catalyst of relatively high surface area and providing riser outlet temperatures in the range of about 950° F. to about 1100° F. The residence time of vaporized oil feed in contact with catalyst particles is preferably below 5 seconds, and preferably restricted in the riser reactor within the range of 0.5–2 seconds. The catalyst employed in the residual oil cracking process of this invention is a spray dried composition in the form of microspherical particles generally of a size in the range of 10 to 200 microns, more usually in the range of 20 to 150 microns and more preferably in the range of 20 to 80 microns, to ensure adequate fluidization properties.

In the residual oil or reduced crude cracking (RCC) operation contemplated, the RCC feed is introduced to a lower, intermediate, or upper portion of a riser zone for contact with catalyst to form a suspension at an elevated temperature; to provide a suspension temperature at the exit of the riser zone in the range of about 950° F. to about 1100° F. The RCC feed is charged to the riser zone in combination with one or more materials such as water, steam, naphtha, CO$_2$ gas and combinations thereof, to aid in vaporization-atomization of the oil feed and act as a lift or fluidizing gas to control temperature as well as hydrocarbon and catalyst residence time in the riser reactor. In one embodiment a suspension of catalyst in lift gas such as steam, naphtha, CO$_2$ and combinations thereof is initially formed in a bottom portion of the riser reactor before adding the high boiling RCC feed thereto to form an unflowing suspension in the riser.

The catalyst comprising hydrocarbonaceous and metal deposits is rapidly separated from hydrocarbon vapors of the cracking operation at the exit of the riser reactor by employing techniques known in the art or by employing the vented riser concept described in U.S. Pat. Nos. 4,066,533 and 4,070,159 to Myers, et al, which patents ae incorporated herein by reference thereto.

During the course of the short contact time, high temperature cracking reaction in the riser, metal contaminants, Conradson carbon compounds including tacky asphaltenes when present are deposited on the catalyst particles. After separation from the products of cracking, the catalyst comprising the above identified deposits is collected and stripped in one or more sequentially arranged stripping zones before transfer to a catalyst regeneration zone.

The deactivated cracking catalyst with hydrocarbonaceous deposits including metal contaminants is contacted initially with an oxygen containing gas mixture to remove a portion of the carbonaceous material comprising hydrogen by combustion under limited temperature conditions to form a CO rich flue gas and provide a partially regenerated catalyst. Thereafter residual carbon on the catalyst is removed with CO$_2$ under endothermic regenerating conditions as herein discussed to provide a lower temperature catalyst containing less than 0.1 wt% residual carbon, preferably less than 0.05 wt% residual carbon. The regenerated catalyst thus obtained is then recycled or passed to a bottom portion of the riser cracking zone where it again is suspended and brought in contract with additional high metal and Conradson carbon containing feed to repeat the hydrocarbon conversion-catalyst regeneration cycle.

This invention is particularly directed to a new approach to offsetting the adverse effects of high Conradson carbon containing oils by the incorporation of one or more of a select group of metals, their oxides or their salts into the catalyst matrix which will catalyze the endothermic reaction of carbon with $CO_2$.

Elements of the Periodic Table which were found to catalyze the endothermic removal of hydrocarbonaceous material deposited on particle materials include the following metals, their oxides, salts or an organometallic compound of: Li, Na, K, Sr, V, Ta, Mo, Re, Fe, Co, Ni, Ru, Rh, Pd, Os, Ir, Pt, Cu, Ag, Au, Sn and Bi. These metal additives based on the metal element content may be used in concentrations in the range of from about 0.1 (1000 ppm) to about 10 percent (100,000 ppm) wt%, more usually in the range of from about 0.5 (5000 ppm) to about 5 percent (50,000 ppm) by weight of virgin catalyst. If a suitable metal is added to the catalyst in the conversion-regeneration process sequence, the selected additive metal can be built up or adjusted to a needed and desired concentration on equilibrium catalyst and be maintained at a predetermined and desired level by catalyst replacement and/or select metal addition.

The catalytically active cracking component of the catalyst composition particularly employed is a crystalline aluminosilicate zeolite, commonly known as molecular sieves before catalytic activation thereof. Molecular sieves are initially formed as alkali metal aluminosilicates, which are dehydrated forms of crystalline hydrous siliceous zeolites. However, since the alkali form does not have appreciable cracking activity and alkali metal ions are deleterious to the cracking processes, the aluminosilicates are made catalytically active by ion exchange to replace sodium with other ions such as, for example, ammonium ions and/or rare earth metal ions. The silica and alumina making up the structure of the zeolite are arranged in a definite crystalline pattern containing a large number of small uniform cavities interconnected by smaller uniform channels or pores. The effective size of these pores is usually between about 4 Angstrom and 12 Angstrom.

The zeolites which can be employed to provide cracking catalysts include both natural and synthetic zeolites. The natural occurring zeolites including gmelinite, clinoptilolite, chabazite, dechiardite, faujasite, heulandite, erionite, analcite, levynite, sodalite, cancrinite, nephelite, lcyurite, scolicite, natrolite, offertite, mesolite, mordenite, brewsterite, ferrierite, and the like. Suitable synthetic zeolites include zeolite Y, A, L, ZK-4B, B, E, F, H, J, M, Q, T, W, X, Z, ZSM-types, alpha, beta and omega. The term "zeolites" as used herein contemplates not only aluminosilicates, but substances in which the aluminum is replaced by gallium and substances in which the silicon is replaced by germanium and also the so called pillared clays more recently introduced into the art.

The matrix material for the cracking catalyst should and preferably does possess good hydrothermal stability. Examples of materials exhibiting relatively stable pore characteristics are alumina, silica alumina, silica, clays such as kaolin, meta-kaolin, halloysite, anauxite, dickite and/or nacrite, and combinations of these materials. Montmorillonite may be added to increase the acidity of the matrix. Clay may be used in its natural state or it may be thermally modified.

DISCUSSION OF SPECIFIC EMBODIMENTS

Figure 1:
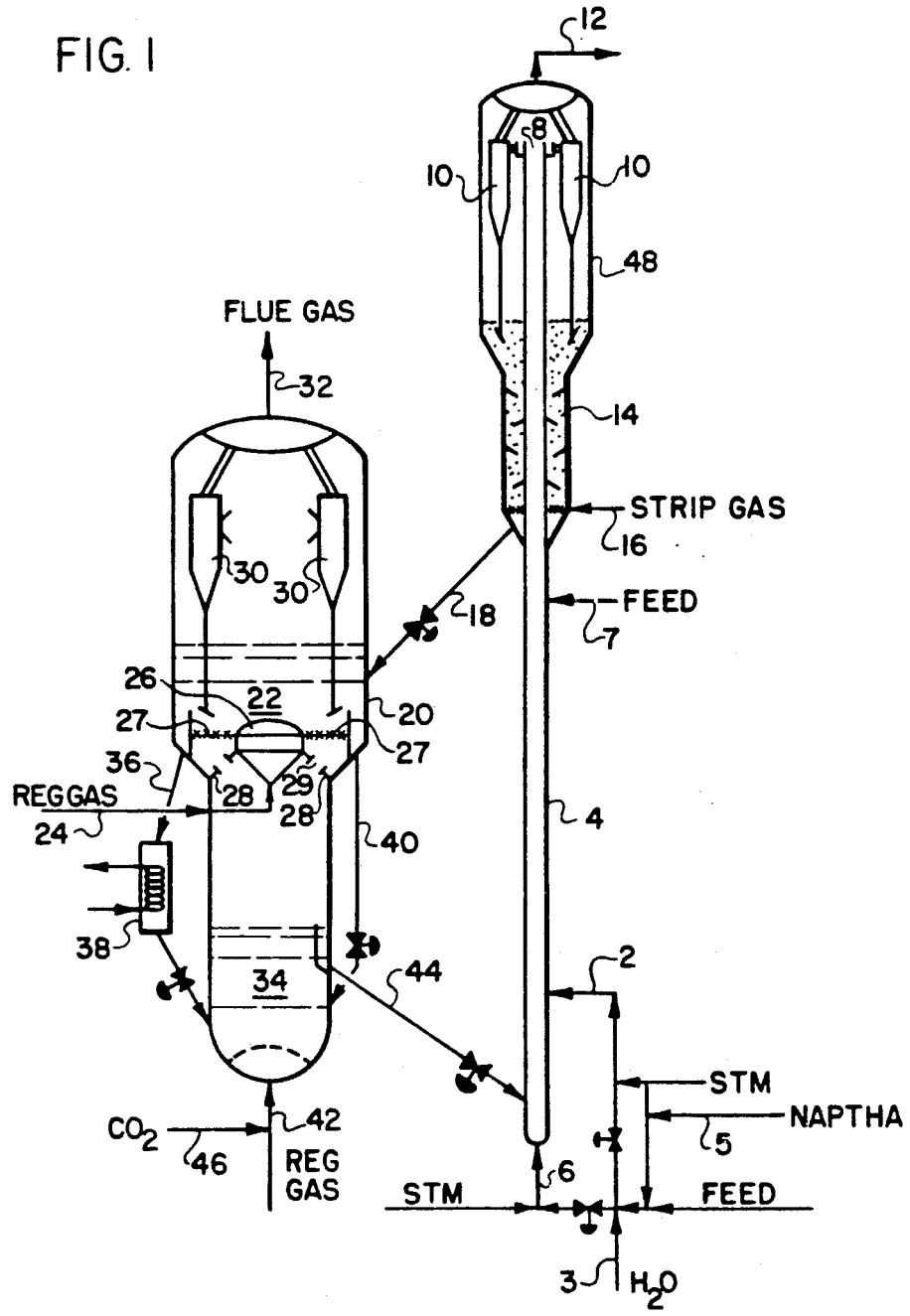
FIG. 1 is a schematic diagram of an arrangement of apparatus for carrying out the riser cracking of a residual oil feed and regeneration of catalyst used therein.

It is not proposed to define the exact mechanism for the endothermic reaction of carbon with carbon dioxide to yield carbon monoxide except to say it does occur in the presence of a select group of metal additives according to this invention. It has been found, however, that a preferred amount of the metal additive on the catalyst to catalyze the reaction will be in the range of about 0.2 to 5 wt% and preferably it should be at least 0.5 wt% or sufficient to promote the reaction at temperatures in the range of 1300° to 1500° F. and preferably not about 1400° F. The activity of the additive metals herein identified was tested towards catalyzing the reaction of coke with carbon dioxide at 1400° F. and 20 minutes reaction time to measure the rate of coke removal. This parameter of time element was utilized to approximate catalyst particle residence time in a dense fluid catalyst bed regenerator. Based on this selected temperature-time relationship, one can identify many examples of metal additives that will promote from 40 to 70% removal of coke through the reaction of carbon with carbon dioxide to form carbon monoxide. This allowed the determination of the best, intermediate and relatively poor metal additives for promoting the reaction under the conditions expected in a catalyst regenerator.

Examples of Additives

The additive metals identified by this invention fall into several groupings and are shown in the following Tables A, B and C, grouped on the basis of the rate of removal of coke deposited on a catalytic material.

TABLE A

HIGHEST ACTIVITY
Additive Metal - 1 wt %; 1400° F.;
Process Time - 20 minutes; Coke on Catalyst - 1.1 wt % C

|  |  | Coke Removal Rate % |
|---|---|---|
| Group IA | Li, Na | 60 |
| GrouP IIA | Sr | 45 |
| Group VIIB | Re | 50 |
| Group VIII | Fe, Co, Ni, Ru, Rh Pd, Os, Ir, Pt | 50 |
| Group IB | Cu, Ag, Au | 45 |

TABLE B

INTERMEDIATE ACTIVITY
Conditions: Same as Table A

|  |  | Coke Removal Rate % |
|---|---|---|
| Group IVA | Sn | 30 |
| GrouP VA | Bi | 30 |

TABLE B-continued

INTERMEDIATE ACTIVITY
Conditions: Same as Table A

| | | Coke Removal Rate % |
|---|---|---|
| Group VB | V | 35 |
| Group VIB | Mo | 30 |

TABLE C

| | | Coke Removal Rate % |
|---|---|---|
| Group IA | K, Rb, Cs | 20 |
| Group IIA | Mg, Ca, Ba | 20 |
| Group IIIB | Sc, Y, La | 20 |
| Group IVB | Ti, Zr, Hf | 25 |
| Group VIB | Cr, W | 25 |
| Group VIIB | Mn | 20 |
| Group IIB | Zn, Cd, Hg | 20 |
| Group IIIA | B, Ga, In | 20 |
| Group VA | As, Sb | 10 |
| Group VIA | Se, Te | 10 |
| Actinide Series | | 25 |
| Lanthanide Series | | 20 |

Table A lists the elements that gave coke removal rates between 45 and 60%, Table B lists the elements that gave coke removal rates of 30 to 35% and Table C lists the remainder of the elements that gave coke removal rates below 30% and in the range of 10 to 25%. This invention recognizes that the rates of coke removal by the elements in Table B and C can be improved by increasing severity, such as contact time, temperature, additive metal concentration, pressure and the like.

The highest activity metal additive for catalyzing the endothermic removal of coke are listed in Table A and those of intermediate activity are listed in Table B. This invention recognizes that these metal additives can be utilized as a single metal additive or a combination of metal additives. The single metal additives can be added to the catalyst during manufacture, after manufacture or spray drying by impregnation techniques or at any point in the catalyst cycle during oil processing and steps subsequent thereto as outlined above. The mixture or combination of additives can be deposited on the catalyst from the carbo-metallic feed as naturally occuring metals in the oil feed, such as nickel, copper, iron and vanadium found as free metals or in prophyrins and asphaltenes.

It is significant to note, that Fe, Ni and Cu of Group A and V of Group B, all normally found in the higher boiling portions of crude oil such as the residual and reduced crude portions thereof, are all significant promoters of the reaction of C with $CO_2$. Furthermore, these metal components are particularly desirable promoters since they are readily available, are low cost elements and do not have the deactivating effects of Group I elements on the zeolite component of the catalyst. Thus, by adjustment of temperature, concentration and contact time, a more select group of the metals may be employed to advantage with zeolite containing cracking catalysts.

This invention recognizes that the selection of the metal additives should preferably have little effect on the cracking activity of the zeolite catalyst, such as neutralization of acidic cracking sites or destruction of the crystallinity of the zeolite structure to yield an amorphous material. Secondly, the cost of the metal additive should not be prohibitive. Thus, based on the criteria of acid site neutralization, zeolite destruction, prohibitive cost and reaction rate, the preferred single and/or combination of metal additives of the invention to catalyze the endothermic removal of coke from catalytic cracking materials would include the following: Fe, V, Co, Ni, Mo and Cu. The most preferred metal additives would be those normally deposited from a reduced crude, residual oil, topped crude or total crude oil would include Fe, Ni, V and Cu.

This invention further recognizes that in addition to the binary mixtures discussed above, binary, ternary and even quaternary reaction mixtures can occur between metal additives of the low activity group and metals not covered in the Groups above. Examples of such additional binary and ternary compounds are shown in Table D.

TABLE D

| | Coke Removal Rate % |
|---|---|
| $Ba_3VTi_2O_9$ | 30 |
| $Sr_3TiO_3$ | 30 |
| $CuTiO_3$ | 30 |

The preferred metal additives identified above are compounds of iron, vanadium, cobalt, nickel, copper, molybdenum, or a mixture of the compounds of these metals since these metals have less of a deactivating effect on a zeolite cracking catalyst. Where the additive is introduced directly into the conversion process, that is into the riser contact zone, into the regenerator or into any intermediate connecting means of the system, the metal additives are preferably organo-metallic compounds of these metals and soluble in the hydrocarbon feed or in a hydrocarbon solvent miscible with the feed. Examples of organo-metallic compounds would include alcoholates, esters, phenolates, naphthenates, carboxylates, dienyl sandwich compounds, and the like. The invention however, is not necessarily limited to the above specific examples, but is intended to include other material suitable for the purpose but not specifically recited.

The organo-metallic additives can be introduced directly into the hydrocarbon conversion zone, at any point along the length of the riser, in a catalyst collection or disengagement vessel or a stripper zone, so that the metal additive will be deposited on the catalyst along with heavy metals and coke formers in the feed or after deposition of the heavy metals and coke formers. When a selected additive metal identified by the invention reaches the regenerator, its oxide is formed either by decomposition of the additive directly to the metal oxide or by decomposition of the additive to the free metal which is then oxidized under the regenerator temperature conditions. This provides an intimate mixture of metal additive and coke and is believed to be one of the more effective means for contacting coke as soon as it is formed in the riser. The metal additive is introduced into the riser by mixing it with the feed or into the disengagement vessel or stripper sufficient to deposit 0.1–10 wt% metal additive on the catalyst, most preferably 0.2–5 wt% metal additive based on virgin catalyst weight.

If the metal additive is added directly into the catalyst during catalyst manufacture or at some other time before the catalyst is introduced into the conversion system, the metal additives are preferably water soluble inorganic salts of these metals, such as acetate, halide, nitrate, sulfate, sulfite and/or carbonate. These additive compounds are soluble in the catalyst slurry or in a water impregnating solution. If the metal additive is not added to the catalyst before or during particle formation, then it can be added by impregnation techniques to the dried catalyst particles, which are preferably spray dried microspheres. Impregnation after drying may be advantageous in some cases where sites of additive metal are likely to be impaired by the catalyst matrix material which might partially cover additive metal sites introduced before spray drying or before some other particle solidification process. Inorganic metal additives may also be introduced into the conversion process along with a water containing stream, such as used to directly cool the regenerator or to lift, fluidize and/or strip catalyst particles in the combination operation.

Another series of active metal additives suitable for use are the binary, ternary and quaternary type compounds produced in employing vanadium immobilization additives described in International Application No. PCT-US81-00356 entitled, "Immobilization of Vanadia Deposited on Sorbent Materials During Carbo-Metallic Oil Conversion" filed on Mar. 19, 1981 and International Application No. PCT-US81-00356 entitled, "Immobilization of Vanadia Deposited on Sorbent Materials During Carbo-Metallic Oil Conversion" filed on Mar. 19, 1981, which patent applications are incorporated herein by reference. These patent applications described the destruction of zeolite by vanadium and the selected additives of the invention which immobilize the vanadium through compound or complex formation, such as vanadium titanate, zirconium titanate, barium vanadium titanate, calcium vanadium titanite, manganese vanadate and the like. This invention recognizes the broad range of binary, ternary and quaternary compounds or complexes that can be formed and which are active compound metal additives to catalyze the $C-CO_2$ reaction to form CO. The invention therefore is not limited to the specific examples given but includes the breadth of the metal additives of the immobilization patent applications cited above coupled with the basic and lower activity metal additive of Table C above.

Examples of Matrices

A suitable matrix material used in preparing the catalysts of this invention is a semi-synthetic combination of clay and silica-alumina as described in U.S. Pat. No. 3,034,994. Preferably the clay is mostly a kaolinite and is combined with a synthetic silica-alumina hydrogel or hydrosol. This synthetic matrix material comprises from about 15 to 75 percent, more preferably from about 20 to 55 percent, of a formed catalyst particle by weight. The proportion of clay is such that the catalyst contains after forming, about 10 to 75 percent, and preferably from about 30 to 50 percent of clay by weight. A preferred composition of the synthetic matrix material contains approximately twice as much clay relative to the synthetically derived silica-alumina. The synthetically derived silica-alumina component should contain from 55 to 95 percent by weight of silica ($SiO_2$), preferably 65 to 85 percent, and about 75 percent in a specific example. Catalyst compositions are contemplated, however, wherein the matrix material consists entirely of silica gel or alumina gel.

Various processes known in the art may be used in preparing a synthetic silica-alumina matrix material such as those described in U.S. Pat. No. 3,034,994, which patent is incorporated herein by reference. One of these processes involves gelling an alkali metal silicate with an inorganic acid while maintaining the pH on the alkaline side. An aqueous solution of an acidic aluminum salt is then intimately mixed with the silica hydrogel so that the aluminum salt solution fills the silica hydrogel pores. The aluminum is thereafter precipitated as a hydrous alumina by the addition of an alkaline compound.

As a specific example of one method of preparation, a silica hydrogel is prepared by adding sulfuric acid with vigorous agitation and controlled temperature, time and concentration conditions to a sodium silicate solution. Aluminum sulfate in water is then added to the silica hydrogel with vigorous agitation to fill the gel pores with the aluminum salt solution. An ammonium solution is then added to the gel with vigorous agitation to precipitate the aluminum as hydrous alumina which combines with silica at the surface of the silica hydrogel pores. The hydrous gel is then processed, for instance, by separating a part of the water on vacuum filters and then drying, or more preferably, by spray drying the hydrous gel to produce microspheres. The dried product is then washed to remove sodium and sulfate ions, either with water or a very weak acid solution. The resulting product is then dried to a low moisture content, usually less than 25 percent by weight, e.g., 10 percent to 20 percent by weight, to provide the finished catalyst product.

The silica-alumina hydrogel slurry is filtered and washed in gel form to affect purification of the gel by the removal of dissolved salts. This enhances the formation of a continuous phase in the spray dried microspherical particles. If the slurry is prefiltered and washed and it is desired to spray dry the filter cake, the latter may be reslurried with enough water to produce a pumpable mixture for spray drying. The spray dried product may then be washed again and given a final drying in the manner previously described.

Examples of Zeolites

The zeolite materials utilized in the several embodiments of this invention are faujasites which possess silica to alumina ratios ($SiO_2/Al_2O_3$) in the range of from about 2.5 to about 7.0, preferably from 3.0 to about 6.0 and most preferably from 4.5 to about 6.0. Synthetic faujasites are widely known crystalline aluminosilicate zeolites and common examples of synthetic faujasites are the X and Y types commercially available. The ultrastable hydrogen exchanged zeolites, such as Z-14XS and Z-14US are also particularly suitable. In addition to faujasites, other types of zeolitic materials which may be employed are mordenite and erionite or offretite.

The preferred synthetic faujasite is zeolite Y which may be prepared as described in U.S. Pat. No. 3,130,007 and U.S. Pat. No. 4,010,116, which patents are incorporated herein by reference thereto. The aluminosilicates of this latter patent have high silica ($SiO_2$) to alumina ($Al_2O_3$) molar ratios, preferably above 4, to give high thermal stability.

The following is an example of a zeolite produced by the silication of a clay. A reaction composition is produced from a mixture of sodium silicate, sodium hydroxide, and sodium chloride formulated to contain 5.27 mole percent $SiO_2$, 3.5 mole percent $Na_2O$, 1.7 mole percent chloride and the balance water. 12.6 parts of this solution are mixed with 1 part by weight of calcined kaolin clay. The reaction mixture is held at about 60° F. to 75° F. for a period of about four days. After this low temperature digestion step, the mixture is heated with live steam to about 190° F. until crystallinization of the material is complete, for example, about 72 hours. The crystalline material is filtered and washed to give a silicated clay zeolite having a silica to alumina ratio of about 4.3 and containing about 13.5 percent by weight of Na$_2$O on a volatile free basis. Variation of the components and of the times and temperatures, as is usual in commercial operations, will produce zeolite having silica to alumina mole ratios varying from about 4 to about 5. Mole ratios above 5 may be obtained by increasing the amount of SiO$_2$ in the reaction mixture. The sodium form of the zeolite is then exchanged with polyvalent cations to reduce the Na$_2$O content to less than about 1.0 percent by weight, and preferably less than 0.1 percent by weight. Procedures for removing alkali metals and putting the zeolite in the proper form are well-known in the art as described in U.S. Pat. Nos. 3,293,192; 3,402,996; 3,446,727; 3,449,070; and 3,537,816; which patents are incorporated herein by reference thereto.

The amount of crystalline zeolitic material dispersed in the matrix material based on the final fired or calcined product should be at least about 10 weight percent, preferably in the range of about 20 to 50 weight percent, and more preferably from about 20 to 40 weight percent.

Crystalline aluminosilicate zeolites exhibit acidic sites on both interior and exterior surfaces with the largest proportion to total surface area and cracking sites being internal to the particles within the crystalline micropores. These zeolites are usually crystallized as regularly shaped, discrete particles of approximately 0.1 to 10 microns in size and, accordingly, this is the size range normally provided by commercial catalyst suppliers. To increase exterior (portal) surface area, the particle size of the zeolites for the present invention should preferably be in the lower portion of this size range. The preferred zeolites are thermally stabilized with hydrogen and/or rare earth ions and are steam stable up to about 1650° F.

Examples of Additives in Matrix

In one preferred embodiment of the invention, the metal additive may be incorporated directly into the matrix material. To an aqueous slurry of the raw matrix material and zeolite is mixed the metal additive in an amount to yield approximately 0.1 to 10 wt% concentration thereof on the finished catalyst. These metal additives can be added in the form of a water soluble compound such as nitrate, halide, sulfate, carbonate or the like. This mixture is then spray dried to yield a finished catalyst as a microspherical particle of a size in the range of 10 to 200 microns in size with the select active metal additive deposited with the matrix and/or on the outer surface of the catalyst particle.

The zeolites and metal additive are intimately dispersed in the matrix materials for use as a cracking catalyst by any one of the methods well-known in the art, such as those disclosed, for example, in U.S. Pat. Nos. 3,140,249 and 3,140,253 to Plank, et al; U.S. Pat. No. 3,660,274 to Blazek, et al; U.S. Pat. No. 4,010,116 to Secor, et al; U.S. Pat. No. 4,079,019 to Scherzer, et al; which patents are incorporated herein by reference thereto.

After introduction of the zeolite and metal additive, the composition is preferably slurried and spray dried to form catalyst microspheres. The particle size of the spray dried matrix may be restricted to within the range of 20 to 150 microns, and more usually in the range of 20 to 80 microns. The finished catalyst should contain from 5 to 50% by weight of the zeolite, preferably a rare earth or ammonia exchanged sieve of either or both the X and Y variety and preferably in an amount of from about 15 to 45% by weight, and more preferably in the range of 20 to 40% by weight. To further enhance the catalyst characteristics, the rare earth exchanged sieves are calcined and thereafter may be further exchanged with rare earths or ammonia to create an exceptionally stable sieve.

The following is one example of a spray dryable composition. A silica sol component is prepared by mixing sodium silicate with water and rapidly mixing with acid to provide a sol which comprises from about 0.5 to 0.6% by weight Na$_2$O and sufficient acid to provide a pH of between about 0.5 to 3.3 and preferably between about 1.0 and about 3.0. The sol is prepared by combining commercially available 40° Baume 3.25 Na$_2$O.SiO$_2$ solution with a sulfuric acid solution having a concentration in the range of 9 to 36% by weight H$_2$SO$_4$. Optionally, the sol may be combined with from about 15 to 45% by weight total solids and the remainder water. The metal additive may be added to this sol and/or to the zeolite slurry component identified below.

A basic zeolite slurry component is made by mixing the desired quantities of a suitable zeolite in the sodium form with a sufficient quantity of sodium silicate solution (typically 40° Baume) and water to give a product having the desired pH. Clay is added to the basic zeolite slurry component if desired. The pH of the zeolite slurry component is maintained above about 10 and preferably between about 10.5 and about 14. The slurry component will contain from about 10 to 17% by weight sodium silicate, from about 10 to 17% by weight zeolite and more usually from about 15 to 40% by weight clay and the balance water. The total solids content of the zeolite containing basic slurry ranges from about 33 to 46% by weight.

In the next step of this catalyst preparation process, the two streams are mixed instantaneously and homogeneously in amounts in the range of from about 1.5 to about 7.5 parts by weight of the above defined sol component mixed with each part by weight of the zeolite slurry component. The mixture is immediately atomized, i.e. sprayed, into a heated gaseous atmosphere, such as air and/or steam having a temperature of 25° to 300° F., using a commercially available spray drier. A water slurry of the spray formed microspherical particles comprises a pH in the range of about 3.0 to about 10.0.

It is critical to successful operation of this process that the mixing and subsequent spraying drying take place rapidly to prevent premature setting of the gel. The air atomizer used should feed the two components into the nozzle at pressures of about 90 to 150 psi and maintain the air in the nozzle at about 80 to 90 psi, preferably about 81–83 psi. As an alternative to premixing with either component, the metal additive may also be fed separately to the nozzle via a separate line operated at pressures of about 90 to 150 psi.

Example of Copper Impregnated Catalyst

A copper impregnated catalyst was prepared to study its ability to catalyze the endothermic removal of coke (hydrocarbonaceous material) deposited on a catalytic material during carbo-metallic oil processing. A zeolite containing catalyst suitable for use in a reduced crude cracking (RCC) process was coked to yield 1.1 wt% carbon on catalyst by processing a reduced crude over it at 1000° F. 100 grams of this coked catalyst was impregnated with 60 grams of a water solution containing 2.12 g. of cupric chloride ($CuCl_2$). There was no excess solution to decant since this technique (impregnating volume) is the minimum volume impregnation procedure. The catalyst was dried under vacuum at 100° C. for three hours and analyzed by x-ray fluorescence to show that 1 wt% Cu was present. Since coke is present on the catalyst it could not be calcined before use. The coked-copper containing catalyst was then placed in a reaction chamber and heated to about 1450° F. in an inert gas. At that time, a gas containing 100% carbon dioxide was introduced and the rate of conversion of coke with carbon dioxide to yield carbon monoxide was measured with time. The rate of coke removal was shown to be 45%, as reported in Table A. The catalyst was then further regenerated in air to yield an essentially coke free catalyst for testing of its MAT conversion activity. The effect of the above discussed metal additives on the cracking activity of a catalyst is highly important and is discussed in considerable detail below.

The select catalyst compositions of this invention include solids of high catalytic activity comprising crystalline zeolites in a matrix of clay, kaolin, silica, alumina, smectites and other 2-layered lamellar silicates, silica-alumina and mixtures thereof. The surface area of these catalysts are preferably above 100 $m^2/g$ and they have a pore volume preferably in excess of 0.2 cc/g and a micro-activity (MAT) value in volume percent conversion as measured by ASTM Test Method No. D-3908-80 of at least 60, and preferably in the range of 65–90.

It is preferred within the novel concepts and method of utilization as herein described to employ a catalyst having a relatively high level of cracking activity, providing high levels of conversion and selectivity at low residence times.

For example, it is preferred to employ a catalyst which, in the course of extended operation under prevailing process conditions is sufficiently active for sustaining a level of conversion of at least about 50% and more preferably at least about 60%. In this connection, conversion is expressed as liquid volume percent based on fresh feed.

The preferred catalyst may be defined, for example, as one which, in its virgin or equilibrium state, exhibits a specified activity expressed as a percentage in terms of MAT (micro-activity test) conversion. For purposes of the present invention, the foregoing percentage is the volume percentage of standard feedstock which a catalyst under evaluation will convert to 430° F. end point gasoline, lighter products and coke at 900° F., 16 WHSV (weight hourly space velocity calculated on a moisture free basis using clean catalyst which has been dried at 1100° F., weighed and then conditioned for a period of at least 8 hours at about 25° C. and 50% relative humidity, for about one hour or less prior to contacting the feed), and 3 C/O (catalyst to oil weight ratio) by ASTM D-32 MAT test D-3907-80, using an appropriate standard feedstock, e.g. a sweet light primary gas oil, such as that defined as follows:

| | |
|---|---|
| API Gravidity at 60° F., degrees | 31.0 |
| Specific Gravity at 60° F., g/cc | 0.8708 |
| Ramsbottom Carbon, wt % | 0.09 |

| -continued | |
|---|---|
| Conradson Carbon, wt % (est.) | 0.04 |
| Carbon, wt % | 84.92 |
| Hydrogen, wt % | 12.94 |
| Sulfur, wt % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol % | 31.7 |
| Olefins, Vol % | 1.8 |
| Naphthenes, Vol % | 44.0 |
| Aromatics, Vol % | 22.7 |
| Average Molecular Weight | 284 |
| Nickel | Trace |
| Vanadium | Trace |
| Iron | Trace |
| Sodium | Trace |
| Chlorides | Trace |
| BS&W | Trace |
| Distillation | ASTM D-1160 |
| IBP | 445 |
| 10% | 601 |
| 30% | 664 |
| 50% | 701 |
| 70% | 734 |
| 90% | 787 |
| FBP | 834 |

The gasoline end point and boiling temperature-volume percent relationships of the products produced in the MAT conversion test may, for example, be determined by simulated distillation techniques, for example by modification of the gas chromatograph "Sim-D" technique of ASTM D-2887-73. The results of such simulations are in reasonable agreement with the results obtained by subjecting larger samples of material to standard laboratory distillation techniques. Conversion is calculated by subtracting from 100 the volume percent (based on fresh feed) of those products heavier than gasoline which remain in the recovered product.

On pages 935–937 of Hougen and Watson, "Chemical Process Principles", John Wiley & Sons, Inc. N.Y. (1947), the concept of "Activity Factors" is discussed. This concept leads to the use of "relative activity" to compare the effectiveness of an operating catalyst against a standard catalyst. Relative activity measurements facilitate recognition of how the quantity requirements of various catalysts differ from one another. Thus, relative activity is a ratio obtained by dividing the weight of a standard or reference catalyst which is or would be required to produce a given level of conversion, as compared to the weight of an opeating catalyst (whether proposed or actually used) which is or would be required to produce the same levels of conversion of the same or equivalent feedstock under the same or equivalent conditions. Said ratio of catalyst weights may be expressed as a numerical ratio, but preferably is converted to a percentage basis.

The standard catalyst is preferably chosen from among catalysts useful for conducting the present invention, such as for example, zeolite containing fluid cracking catalysts, and is chosen for its ability to produce a predetermined level of conversion in a standard feed under the conditions of temperature, WHSV, catalyst to oil ratio and other conditions set forth in the preceding description of the MAT conversion test and in ASTM D-32 MAT test D-3907-80. Conversion is the volume percentage of feedstock that is converted to 430° F. endpoint gasoline, lighter products and coke.

The catalyst may be introduced into the process in its virgin form or, as previously indicated, in other than its virgin form, e.g., one may use equilibrium catalyst withdrawn from another unit, such as catalyst that has been employed in the cracking of a different feed.

A preferred activity level of virgin and non-virgin catalyst "as introduced" into the process of the present invention is at least about 20% by MAT conversion test and preferably at least about 40% but more preferably at least about 60% in terms of relative activity. However, it will be appreciated that, in the case of non-virgin catalysts supplied at high addition rates, the lower activity levels may be acceptable in some applications.

Representative feedstocks contemplated for use in the process of the invention include whole crude oils; heavy fractions of crude oils such as topped crude, residual oils, reduced crude, vacuum fractionator bottoms, other fractions containing heavy residua, coal-derived oils, shale oils, waxes, untreated or deasphalted residua, and blends of such fractions with light and heavy gas oils such as vacuum gas oil and the like. A high Conradson carbon feed for conventional FCC processing is one having up to 1.0 wt% Conradson carbon, and undesirably from about 1.0 to 2.0 wt% Conradson carbon when a relatively small amount of a special low metals containing reduced crude (5–25%) is mixed with virgin gas oil to provide a FCC feedstock. A high Conradson carbon feed for RCC processing by the present invention is one having more than 1.0 ppm vanadium, and a Conradson carbon value greater than 4 wt% and more usually at least 8 wt%. In either case, the anticipated weight ratio of vanadium to nickel in the feed without special addition of additive nickel as in the range of from about 1:3 to 5:1, and more frequently greater than about 1:1.

A carbo-metallic containing feed contemplated for use in the method of this invention is one boiling above about 650° F. comprising 10 wt% of material which does not boil below 1025° F. having a heavy metal content of at least about 4 ppm nickel equivalents (ppm total metals being converted to nickel equivalents by the formula: Ni eq.=Ni+V/4.8+Fe/7.1+Cu/1.23), a Conradson carbon residue value greater than about 4.0, and a vanadium content of at least 1.0 ppm. The feedstocks for which the invention is particularly useful will have a heavy metal content of at least about 5 ppm nickel equivalents, a vanadium content of at least 2.0 ppm, and a Conradson residue of at least about 4.0. The greater the heavy metal content and the greater the proportion of vanadium in that heavy metal content, the more advantageous the metal additive and processing concepts of this invention becomes. A particularly preferred feedstock for treatment by the process of the invention includes a residual oil or reduced crude comprising 70% or more of a 650° F.+material having a fraction greater than 20% boiling above 1025° F. at atmospheric pressure, a metals content of greater than 5.5 ppm nickel equivalents of which at least 5 ppm is vanadium, a vanadium to nickel atomic ratio of at least 1.0, and a Conradson carbon residue greater than 8.0. This particular feed may also have a hydrogen to carbon ratio of less than about 1.8 and coke precursors in an amount sufficient to yield about 4 to 14% coke by weight based on fresh feed. The feed is preferably pretreated however to remove sodium to a level less than 1 ppm.

With respect to the tolerance levels of heavy metals on the catalyst itself, such metals may be permitted to accumulate on the catalyst to levels in the range of from about 3,000 to about 70,000 ppm of total metals, preferably more likely from 10,000 to 30,000 ppm, of which 5, preferably to 80% is vanadium.

The heavy oil residual feed may contain nickel in natural or added amounts so that oxides of nickel may be relied upon to help tie up vanadium pentoxide in high melting complex, compound or alloy. The invention therefore contemplates controlling the amounts of nickel in the feed by introducing a nickel additive or a feedstock with high nickel to vanadium ratios to offset high vanadium levels so that compounds of this metal, either alone or in combination with other metal additives, comprise the select metal additive of the invention desired to catalyze the endothermic removal of coke. A nickel containing catalyst may also be made by first using virgin catalyst, with or without another metal additive, in a conversion process employing a feedstock with a high nickel to vanadium ratio; and then using the resulting equilibrium catalyst as make-up catalyst in the process using a high vanadium feed. In these embodiments, the atomic ratio of nickel to vanadium on the catalyst should be greater than 1.0, preferably at least about 1.5.

The hydrocarbon conversion contemplated in the process of this invention is sufficiently severe to convert from 50 to about 90 percent of the carbo-metallic containing oil feed to gasoline on a per pass basis and produce coke in amounts of 4 to 14 percent by weight based on weight of fresh feed. This coke is laid down on the catalyst as hydrocarbonaceous material in amounts in the range of about 0.3 to 3 percent by wieght of catalyst, depending upon the catalyst to oil ratio (weight of catalyst to weight of feedstock) used in the riser reactor.

A residual oil feed, with or without decarbonizing-demetallizing pretreatment as described in a copending application, in introduced as shown in FIG. 1 into lower portion of a riser reactor zone to form a high temperature suspension with the improved cracking catalyst prepared in accordance with this invention and obtained from the catalyst regeneration operation. Steam, naphtha, water, flue gas and/or other suitable diluent material is preferably introduced to the riser along with the feed and catalyst. These diluents may be from a fresh source or may be recycled from a process stream in the refinery. The diluent is relied upon to maintain desired suspension-vapor velocity in the riser, to lower the feed partial pressure in the riser and effect some temperature control in the riser.

As the catalyst feed suspension travels up the riser, it is catalytically cracked to form five products known in the industry as dry gas, wet gas, catalytic naphtha, light cycle oil, heavy cycle oil and/or a slurry oil. At the upper end of the riser, the catalyst particles are quickly separated from product vapors. The catalyst which then contains hydrocarbonaceous deposits formed in the riser and metal deposits is stripped and sent to a catalyst regenerator to remove hydrocarbonaceous material by oxygen combustion and reaction with added carbon dioxide as herein described. Separated product vapors are sent to a fractionator for separation and recovery to provide the five basic products above identified.

The invention herein described may be utilized in conventional FCC processes to some considerable advantage when processing high carbon producing feeds. Preferred riser conditions for an FCC process employing the concepts of this invention are summarized in Table E-1. The preferred operating conditions for a riser RCC conversion operation processing reduced crudes are summarized in Table E-2. In these tables, the abbreviations used have the following meanings: "Temp." for temperature, "Dil." for diluent, "pp" for partial pressure, "wgt" for weight, "V" for vapor, "Res." for residence, "C/O" for catalyst to oil ratio, "Cat." for catalyst, "bbl" for barrel, "MAT" for microactivity by the MAT test using a standard feedstock, "Vel." for velocity, "cge" for charge, "d" for density and "Reg." for regenerated.

TABLE E-1
FCC RISER CONDITIONS

| Parameter | Broad Operating Range | Preferred Range |
|---|---|---|
| Feed Temp. | 400–800° F. | 400–650° F. |
| Steam Temp. | 200–500° F. | 300–400° F. |
| Reg. Catalyst Temp. | 1000–1400° F. | 1175–1350° F. |
| Riser Exit Temp | 900–1200° F. | 925–1050° F. |
| Pressure | 0–100 psia | 10–50 psia |
| Water/Feed | 0.01–0.15 | 0.01–0.10 |
| Dil. pp/Feed pp | 0.15–2.0 | 0.25–1.0 |
| Dil. wgt/Feed wgt | ≦0.2 | 0.01–0.1 |
| V. Res. Time | 0.1–5 | 0.5–3 sec. |
| C/O, wgt. | 4–12 | 5–10 |
| Lbs. Cat./bbl Feed | 0.01–2.0 | 0.05–1 |
| Inlet Cat. MAT | >60 vol. % | 70–85 |
| Outlet Cat. MAT | ≧55 vol. % | ≧65 |
| V. Vel. | 25–90 ft./sec. | 30–60 |
| V.Vel./Sorb. Vel. | ≧1.0 | 1.2–2.0 |
| Dil. Cge. Vel. | 5–90 ft./sec. | 10–50 |
| Oil Cge. Vel. | 1–50 ft./sec. | 5–50 |
| Inlet Cat. d | 1–9 lbs./ft.$^3$ | 2–6 |
| Outlet Cat. d | 1–6 lbs./ft.$^3$ | 1–3 |

TABLE E-2
RCC RISER CONDITIONS

| Parameter | Broad Operating Range | Preferred Range |
|---|---|---|
| Feed Temp. | 400–800° F. | 400–650° F. |
| Steam Temp. | 200–500° F. | 300–400° F. |
| Reg. Catalyst Temp. | 1100–1500° F. | 1275–1450° F. |
| Riser Exit Temp. | 900–1400° F. | 950–1100° F. |
| Pressure | 0–100 psia | 10–50 psia |
| Water/Feed | 0.05–0.30 | 0.05–0.15 |
| Dil. pp/Feed pp | 0.25–3.0 | 1.0–2.5 |
| Dil. wgt/Feed wgt | ≦0.4 | 0.1–0.3 |
| V. Res. Time | 0.1–5 | 0.5–3 sec. |
| C/O, wgt. | 3–18 | 5–12 |
| Lbs. Cat./bbl Feed | 0.1–4.0 | 0.2–2.0 |
| Inlet Cat. MAT | >50 vol. % | >60 |
| Outlet Cat. MAT | >20 vol. % | ≧40 |
| V. Vel. | 25–90 ft./sec. | 30–60 |
| V. Vel./Cat. Vel. | ≧1.0 | 1.2–2.0 |
| Dil. Cge. Vel. | 5–90 ft./sec. | 10–50 |
| Oil Cge. Vel. | 1–50 ft./sec. | 5–50 |
| Inlet Cat. d | 1–9 lbs./ft.$^3$ | 2–6 |
| Outlet Cat. d | 1–6 lbs./ft.$^3$ | 1–3 |

In cracking carbo-metallic oil containing feedstocks referred to herein as residual oils, reduced crudes, etc., and regeneration of catalyst used therein, the regenerating gas may be any oxygen containing gas suitable to convert carbon to carbon oxides. Air is highly suitable for the exothermic combustion of carbonaceous material and hydrogen therein in view of its ready availability. The amount of air required per pound of coke for combustion and the amount of carbon dioxide required per pound of coke for endothermic removal depends upon the Conradson carbon content of the feedstock, retained residual coke level on the catalyst and the ratio of the exothermic to desired endothermic reactions to maintain the catalyst temperature during regeneration below 1600° F. and preferably in the range of 1350°–1500° F. The amount of air employed also depends upon the amount of other combustible materials present in the carbonaceous deposit, such as hydrogen and sulfur.

The catalyst regeneration of this invention is maintained at a temperature in the range of about 1250° F. up to about 1600° F., and preferably from 1350° to about 1500° F. to achieve adequate coke removal following the concepts of this invention while keeping catalyst particles below temperatures at which undesired significant catalyst degradation can occur. In order to maintain these desired temperatures constraints according to the present invention the rate of oxidative burning is restricted or controlled so as to remove only a portion of the carbonaceous deposits by the relative amounts of oxidizing gas charged to the regenerator and by relying upon the endothermic reaction between carbon dioxide and carbon.

The regenerator exothermic and endothermic carbon removal reactions are carried out so that the amount of carbon remaining on regenerated catalyst is less than about 0.25, usually less than about 0.05 percent and preferably less than about 0.01 percent on a substantially moisture-free weight basis.

The carbon dioxide employed in the regeneration operation of this invention can come from substantially any available source. The $CO_2$ may be a flue gas product of a FCC or RCC regeneration. Flue gases comprising combustible material can be processed through a CO boiler to increase the $CO_2$ content and decrease the CO content thereof below combustion supporting levels. In addition, pure carbon dioxide from available outside sources can be employed. The flue gas from a process employing the special additive metals and method of utilization defined by this invention can be processed through a CO boiler to increase the carbon dioxide content thereof before recycle to the regeneration operation for conversion of carbon as herein defined.

REGENERATION OPERATION CONCEPTS

The regeneration operation of this invention is a significant departure from known prior art regeneration operations in that it encompasses both an exothermic removal of carbonaceous material with oxygen in combination with endothermic removal of substantial carbonaceous residue with carbon dioxide in a temperature balanced regeneration operation arranged to particularly restrict regeneration temperatures below 1600° F. and preferably below 1500° F. and in the range of 1350° to about 1450° F. It is also contemplated restricting the temperature of the catalyst being regenerated to temperatures below 1400° F. In the combination regeneration operation of this invention, the exothermic state of regeneration heats the catalyst particles to a desired elevated temperature by effecting partial combustion of carbonaceous deposits and hydrogen therein with an oxygen restricted regeneration gas to produce a CO rich flue gas.

It will be recognized by those skilled in the art that the regeneration sequence of this invention may be accomplished in many different apparatus arrangements other than specifically shown in FIG. 1. That is, a reactor vessel provided with a vertical baffle member in the lower portion thereof may confine an upflowing mass of catalyst particles on one side of the baffle undergoing oxygen regeneration and a downflowing mass of catalyst on the opposite side of the baffle undergoing residual carbon removal with $CO_2$. In this arrangement a CO rich flue gas in the dispersed phase of catalyst above each mass of catalyst may be combined in a common dispersed phase before separation from entrained particles as by cyclones and recovered from the combination operation. On the other hand, the mass of catalyst sequentially regenerated as herein provided may be housed in separate sequentially arranged regeneration zones above or adjacent to one another. It is contemplated in yet another embodiment of using a riser contact zone through which a mass of catalyst flows to effect a partial oxidation of the catalyst before effecting the endothermic conversion of residual carbon in one or more sequence of riser contact zones or in a zone comprising a dense fluid mass of catalyst particles adjacent to or about said exothermic riser regeneration zone.

In yet another embodiment, it is contemplated effecting partial removal of carbonaceous material with $CO_2$ in a first contact zone and completing the removal of residual carbon with oxygen in a separate down stream contact zone with hot flue gas product thereof being passed to said endothermic regeneration zone. Also hot regenerated catalyst of said oxygen and/or hot flue gases may be passed to said endothermic regeneration zone to provide a portion of the endothermic heat requirements therein.

In any of the regeneration arrangements contemplated, riser regenerators alone or in combination with dense fluid catalyst bed regenerators, it is, contemplated effecting the exothermic partial regeneration of the catalyst with oxygen containing gas before or after the catalyzed reaction of carbon and hydrogen with carbon dioxide to produce carbon monoxide.

Referring now to FIG. 1 by way of example, a catalyst of an improved composition herein described and obtained from the improved regeneration operation of this invention at a desired elevated temperature normally below about 1500° F. is charged to a lower portion of riser 4. The thus charged catalyst may be mixed with a suspending gasiform medium before being brought in contact with the high boiling residual oil or reduced crude to be converted as herein desired. The residual oil is preferably admixed with a diluent material comprising one or more of water, steam, naphtha and $CO_2$ to assist at least with atomization of the feed at a temperature below about 600° F. before contacting the catalyst to form an upflowing suspension in the riser. In the specific arrangement of FIG. 1, the residual oil or a reduced crude boiling above 650° F. and mixed with a diluent is introduced by conduit 2. Water and/or naphtha may be added by conduit 3 or 5. Provision is also made to add steam as shown to aid in feed vaporization, catalyst fluidization and for controlling contact time in riser 4. The catalyst mixed with vaporous and atomized hydrocarbons to form a suspension travel up riser 4 for a residence contact time therein of 0.1–5 seconds, preferably 0.5–3 seconds and may be restricted to 1 or 2 seconds. The catalyst and vaporous products of hydrocarbon conversion in riser 4 are separated at the riser outlet 8 at a reaction temperature in the range of 900°–1100° F. and preferably in the range of 950° to 1050° F. The vaporous hydrocarbons are passed through a combination of cyclones 10 wherein any entrained catalyst fines are separated and removed by dip legs provided with the hydrocarbon vapors being sent to a fractionator (not shown) via transfer conduit 12. The catalyst with hydrocarbonaceous deposits and metal deposits is collected and passed downwardly through stripper 14 for removal of any entrained hydrocarbon vapors with stripping gas introduced by conduit 16. The stripped catalyst is passed to a dense fluidized bed of catalyst particles 22 in vessel 20. Dense fluidized catalyst bed 22 is contacted in one specific embodiment with a mixture of flue gases comprising $CO_2$, CO and steam from bed 34 in a lower portion of vessel 20. Oxygen containing gas is introduced to bed 22 by conduit 24, chamber 26 and distributing arms 27. A carbon dioxide rich gas is admitted to bed 34 by conduits 46 and 42 beneath dispersion grid 43 to convert the residual carbon to carbon monoxide. The resulting flue gas of the $CO_2 + C$ reaction passes through grid 28 into bed 22. The flue gas product of oxygen regeneration in bed 22 rich in CO is passed through cyclones 30 for removal of catalyst fines before passing to a CO boiler (not shown) to convert carbon monoxide to carbon dioxide $CO_2$ which may be recycled to the regenerator section for use as above described. The partially regenerated catalyst of dense bed 22 in regenerator vessel 20 is transferred to bed 34 by standpipe 40 or by standpipe 36 comprising heat exchanger 38. The partially regenerated catalyst of dense bed 22 is contacted with carbon dioxide rich gas in bed 34 to complete the removal of carbon and hydrogen associated with the catalyst under endothermic reaction conditions thereby cooling the catalyst to a temperature more suitable for use in the hydrocarbon conversion riser zone 4. The regenerated catalyst thus obtained may be stripped in an internal or external stripping zone to remove CO before transfer to riser 4 via conduit 44 to repeat the cycle. The balance of temperatures encountered in the regenerator as to the endothermic reaction of carbon dioxide with carbon to yield carbon monoxide, the reaction of $CO_2$ with hydrogen to yield water and CO, and the exothermic reaction of air with hydrocarbonaceous material to yield carbon oxides and steam yield a regenerated catalyst of low residual carbon. This regeneration operation is in balance with the transfer of spent catalyst to regenerator vessel 20 by conduit 18, the rate of transfer of partially regenerated catalyst from bed 22 to bed 34 by conduits 36 and 40, the transfer of regenerated catalyst from bed 34 to riser 4 by conduit 44, the rates of addition of air or oxygen to the regenerator by conduit 24 and dispersion means 27, and the rates of addition of carbon dioxide containing gas by conduits 46 and 42. The unit above described is considered in thermal balance when the temperature of the regenerated catalyst introduced to riser 4 is about 1350° to 1400° F. and the temperature of the spent catalyst exiting riser 4 is about 975°–1050° F. and preferably about 1000°–1025° F.

At such time that the deposited metal level on the catalyst becomes intolerably high such that catalyst activity and selectivity declines to an undesirable level, additional fresh catalyst is added to the system and deactivated catalyst is withdrawn through special means not shown. Preferably, the fresh catalyst passes through the regenerator 20 to heat it to a desired elevated temperature.

In the case of a virgin catalyst without a select metal additive, the metal additive may be added as an aqueous solution or as an organo-metallic compound in aqueous or hydrocarbon solvents. The place of addition of the metal additive is not particularly critical and can be introduced at any place in the catalyst processing cycle.

Figure 2:
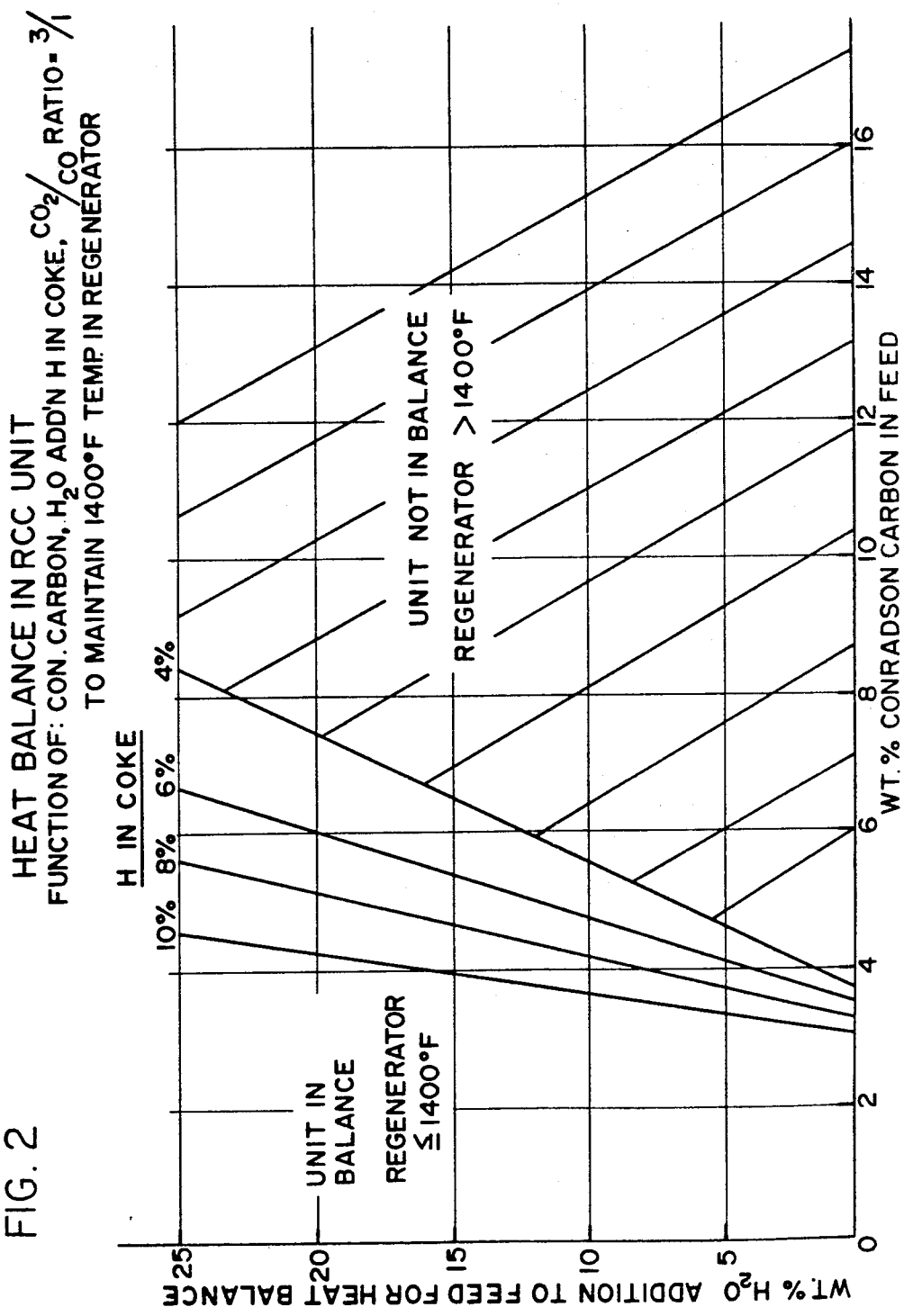
FIG. 2 is a graph depicting heat balance attained in a RCC operation as a function of Conradson carbon in the feed with varying water addition and changing hydrogen content in the carbonaceous material at a flue gas content of $CO_2/CO = 3/1$.
Figure 3:
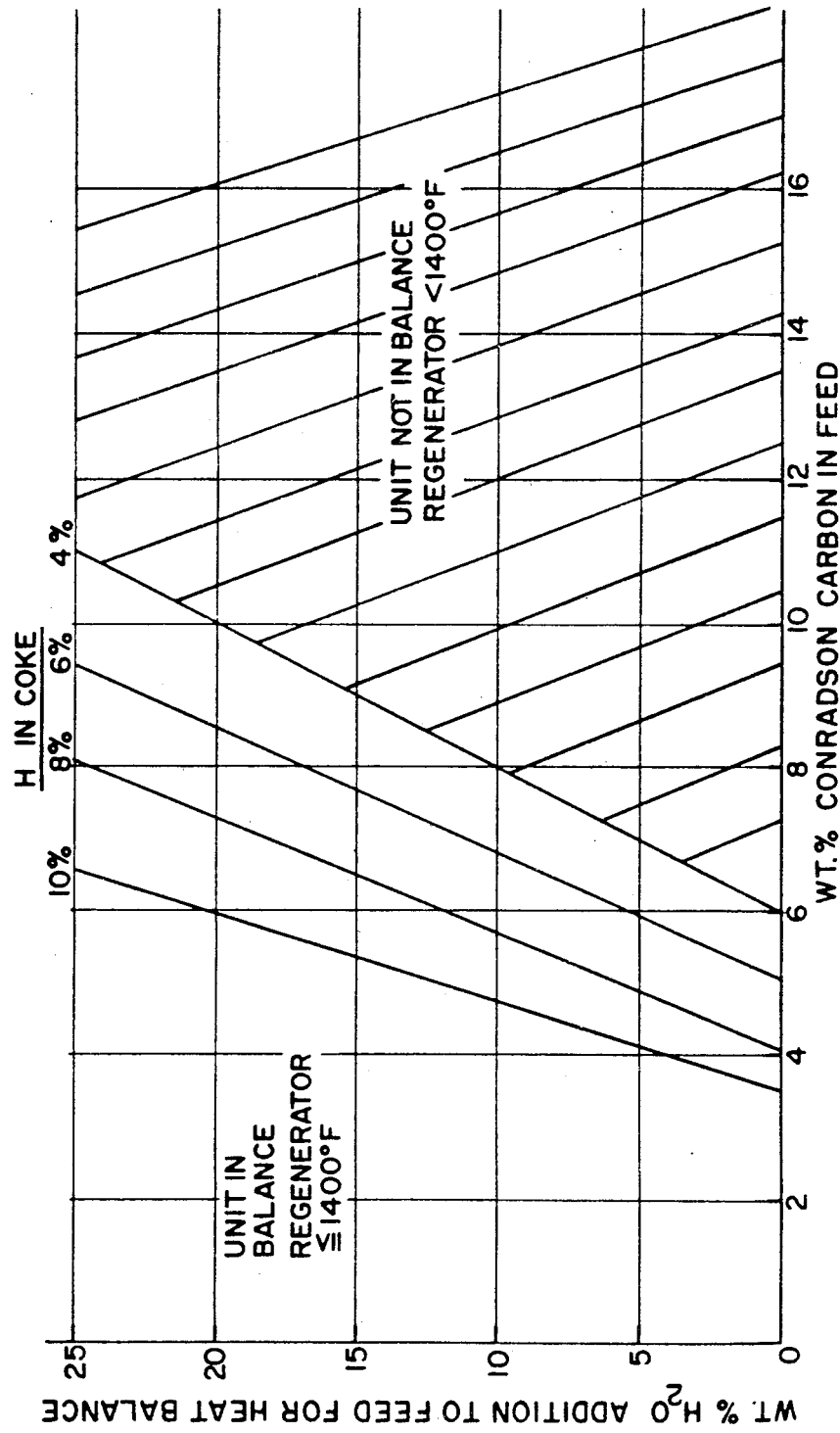
FIG. 3 is a graph depicting heat balance attained in a RCC unit as a function of Conradson carbon in the feed with varying water addition and changing hydrogen content in the coke at a flue gas content of $CO_2/CO = 1$.

The types of feedstocks as to their Conradson carbon content is a limiting factor in any known reduced crude conversion processes. The upper limit for the Conradson carbon content has been set heretofore at about 8 wt% and this is based on employing all known schemes to date. In an attempt to offset this limiting factor one method employs the addition of water to cool the catalyst and regeneration gases. Another method is directed to controlling the $CO_2/CO$ ratio of the exiting regenerator flue gas. The combustion of carbon to CO generates only 40% of the heat of that generated by combusting CO to $CO_2$. These exothermic reactions and methods of control are discussed in the prior art. FIGS. 2 and 3 show the effect of water addition and $CO_2/CO$ ratio on keeping a regenerator and riser section of an RCC unit in heat balance. The maximum upper limit of water addition is approximately 20 wt%, the more practical is 15 wt% with a $CO_2/CO$ ratio ranging from 3/1 down to 1/1 and an average hydrogen content of 5%. The maximum Conradson carbon content of a feedstock can be as high as approximately 8 wt% and still maintain a prior art RCC operation in heat balance.

The problems associated with feed Conradson carbon content as related to increased regenerator temperatures, forces refiners to practice the conversion of reduced crude by the addition of small amounts of reduced crude to gas oil cracking operations. Thus, refiners being limited to practicing reduced crude conversion with feedstocks containing no more than approximately 8 wt% Conradson carbon, excludes the use of readily available and much cheaper crude oils, such as a Mexican Mayan and other inexpensive crude oils.

One solution to this problem of the regeneration of excess heat in a catalyst regenerator section as the Conradson carbon content of the feedstock increases rests with a method of operation for reducing the exothermic regeneration heat released during the combustion of carbon to carbon oxides. Such a method relies upon the endothermic conversion of $CO_2$ with carbon to produce carbon monoxide. In addition, during the endothermic conversion of carbon to carbon monoxide the hydrogen present in carbonaceous deposits is converted to water at a minimal heat release. It is known that during the combustion of coal or the methanation reaction ($CO+H_2$ to yield methane), carbon monoxide can undergo reaction to yield carbon and carbon dioxide. This is an equilibrium reaction which is greatly effected by temperature and pressure. At elevated temperatures and pressures, greatly in excess of that encountered in the regeneration section of a catalytic cracking operation, the reverse reaction of carbon dioxide reacting with carbon to yield carbon monoxide is feasible. Since catalyst regenerators are not employed at the elevated temperatures in the range of 1600°–1800° F. and pressures about 100 psig to 1000 psig, the rate of this reaction is very slow at 1400° F. and 20–30 psig pressure as normally practiced in catalyst regenerators. However, this reaction rate can be substantially increased through the utilization of a select group of metals which catalyze the reaction of carbon dioxide with carbon to yield carbon monoxide. As stated earlier the combustion of carbonaceous material with an oxygen containing gas is an exothermic reaction. The reaction of carbon with carbon dioxide to yield carbon monoxide in the presence of the select metal promotor or additive identified by this invention is an endothermic reaction. By using a proper balance of oxygen regeneration and carbon dioxide regeneration, the catalyst temperature of a regenerator can be controlled within the range of 1350°–1450° F., preferably 1375°–1400° F. and still obtain a regenerated catalyst containing carbon values below 0.1 wt%, usually below 0.05 wt%, and most desirably below 0.01 wt%. The combustion of hydrogen present in coke is a highly exothermic reaction in a regenerator. If the reaction of carbon dioxide with hydrogen in hydrocarbonaceous deposits to produce water and carbon monoxide is promoted, then the overall net heat produced will be a fraction of that produced during the oxidation of hydrogen with air.

A study was undertaken to determine the effectiveness of various metals to catalyze the endothermic reaction of carbon dioxide with carbon on spent cracking catalyst such as FCC and RCC catalysts. 20 Grams of a spent carbonaceous material containing RCC catalyst containing 1.1 wt. coke was charged to a quartz reactor heated by a Lindberg split furnace. The temperature of operation was at 1400° F., carbon dioxide was passed over the coked catalyst containing a select metal additive herein identified at a rate of approximately 1.7 cu. ft. per hour. The effluent gases were tested by a gas chromatograph to determine the amount of CO produced. This test period was for 30 minutes so that a rate of coke removal could be determined that approximates its regenerator residence time in a RCC or FCC process, which time has been approximated to be as much as 20 minutes. Further calculation determined that if a rate of coke removal through the select metal additive catalyzed carbon dioxide reaction could be accomplished in an amount of at least 40 wt% in a 15–20 minute period, this would allow processing of a reduced crude feed containing up to 20 wt% Conradson carbon.

Figure 4:
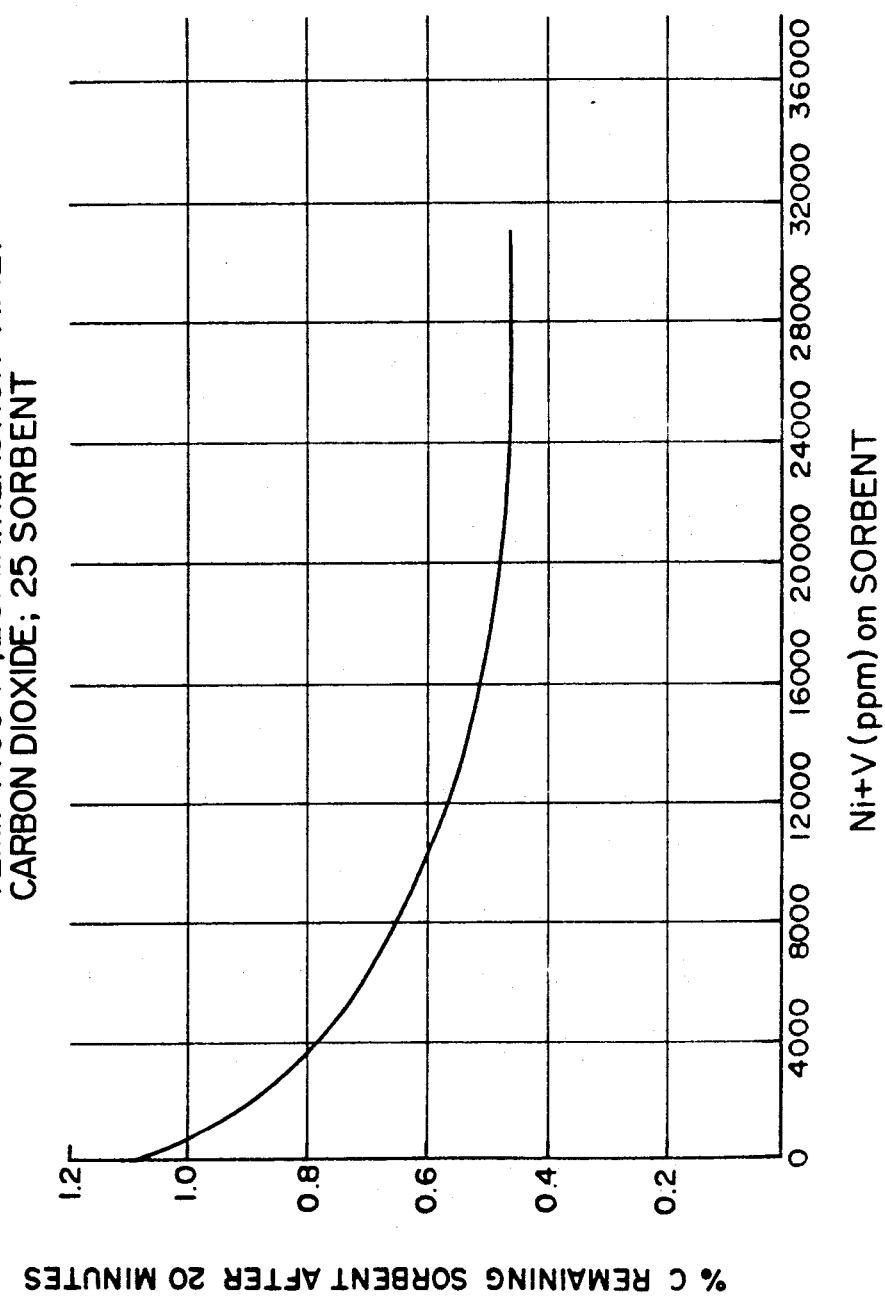
FIG. 4 is a graph showing the effect of a metal additive on catalyzing the reaction of carbonaceous material with carbon dioxide as percent carbon remaining on catalyst with time.

Employing the technique outlined above, a series of metals from the Periodic Chart of the elements were tested. The results of these tests are reported in Tables A, B and C above. The best metal additives providing greater than 40% coke removal are reported in Table A, the intermediate activity metals providing at least 30% coke removal are reported in Table B and least active metals reported in Table C and providing below 30% coke removal. A graphical representation showing the rate of removal of coke with time is shown in FIG. 4. This illustrates the catalyzing properties of the select metal additive identified by the invention, in this case 1 wt% rhodium was impregnated on a spent RCC catalyst containing 1.1 wt% coke. At 1400° F., approximately 50% of the coke has been removed via the endothermic reaction of carbon dioxide with coke.

The next important detail was the effect of metal additive concentration. This is shown in Table F.

TABLE F

CATALYST: RCC Catalyst with 1.1 wt % coke
CONDITIONS: 1400° F., 30 Minutes, 20 g. Catalyst, 1.7 cu. ft. $CO_2$/Hr.

| Promoter | Concentration - Wt % | % Coke Removed |
| --- | --- | --- |
| Li | 1.0 | 70 |
| Li | 0.5 | 44 |
| Li | 0.33 | 35 |
| Li | 0.10 | 25 |
| Rh | 0.50 | 49 |
| Rh | 0.05 | 34 |
| Rh | 0.005 | 26 |
| Rh | 0.0005 | 17 |
| Sr | 1.0 | 45 |
| Sr | 0.5 | 30 |

In the case of the cheaper metal additives concentration is not as important as that related to the precious metals (Pt, Pd, Rh, In) and the coinage metals (Ag, Au). At concentrations that become economically feasible it will be noted that the rate of reaction is found too low to making use thereof in a practical process. However, in the event more thermally stable catalysts suitable for use at temperatures in the range of 1500°–1600° F. or above 1600° F. are developed which would allow higher temperature regeneration one might take advantage the high rates shown by precious metals and coinage metals at low concentrations. In Table G there is also shown clearly the effect of additive metal concentration and temperature when using a copper promoted catalyst.

TABLE G

EFFECT OF TEMPERATURE - CONCENTRATION
CATALYST: 20 g. RCC Catalyst with 1.1 wt % Coke
CONDITIONS: 30 min., 1.7 cu. ft. $CO_2$/Hr.

| Promoter | Concentration - Wt % | Temp. °F. | % Coke Removal |
|---|---|---|---|
| $CuCL_2$ | 1.0 | 1400 | 55 |
| $CuCL_2$ | 0.5 | 1400 | 37 |
| $Cu(NO_3)_2$ | 1.0 | 1400 | 45 |
| $Cu(NO_3)_2$ | 0.5 | 1400 | 28 |
| $Cu(NO_3)_2$ | 1.0 | 1350 | 40 |
| $Cu(NO_3)_2$ | 1.0 | 1400 | 45 |
| $Cu(NO_3)_2$ | 1.0 | 1450 | 58 |

Having demonstrated the effectiveness of various metal additives towards catalyzing the endothermic reaction of coke with carbon dioxide to yield carbon monoxide, the study of temperature and concentration effects, the effect of these metal additives on the cracking activity of the FCC or RCC catalyst was examined. The addition of the preferred metal additives above identified during manufacture, after manufacture, by impregnation or addition during the processing were selected to minimize neutralizing the active acidic cracking sites of cracking catalyst used in FCC-RCC operations. These active acidic cracking sites are present within the crystalline aluminosilicate zeolite and may be present to some extent also within the matrix material of the catalyst. A series of catalysts were impregnated with various metal additives, tested for their activity in catalyzing the endothermic removal of coke with carbon dioxide, the remainder of the coke was removed by calcination in air at 1000° F. to yield a catalyst with less than 0.01 wt%C and then tested for their MAT activity as discussed earlier in this application. The results of these tests are given in Table H.

TABLE H

| | CATALYST: From RCC Operations | | | |
|---|---|---|---|---|
| Metal Additive | Wt. % on Catalyst | MAT Conversation | HPF | CPF |
| None | 0 | 61 | 13 | 1.2 |
| Cu | 1 | 62 | 18 | 1.7 |
| Fe | 1 | 52 | 22 | 2.3 |
| Li | 1 | 10 | 10 | 3.9 |
| Li | 0.5 | 16 | 11 | 3.7 |
| Sr | 1.0 | 50 | 10 | 1.2 |
| Sr | 0.5 | 51 | 13 | 1.6 |

Although the alkali and alkaline metal additives are excellent materials to catalyze the reaction of coke with carbon dioxide they also poison or neutralize the acidic cracking sites of the zeolite to yield a catalyst of low cracking activity. Whereas the true metals, such as Cu, Fe, Pt, Rh, and the like do not poison or neutralize the acidic cracking sites and yield a catalyst of near similar cracking acitivity.

In Table H, "CPF" stands for Carbon Producing Factor and is defined as the ratio of the amount of coke produced by a test catalyst to the amount of coke produced by a standard catalyst at the same conversion level. "HPF" stands for Hydrogen Producing Factor and is defined as the ratio of the amount of hydrogen produced by a test catalyst to the amount of hydrogen produced by a standard catalyst at the same conversion level. Copper, surprisingly and unexpectedly did not give a large increase in the HPF and CPF values as would be expected. At low concentrations copper is more active for carbon and hydrogen production than nickel, yet it only showed a slight increase in such characteristics at higher concentrations in the catalyst.

Figure 5:
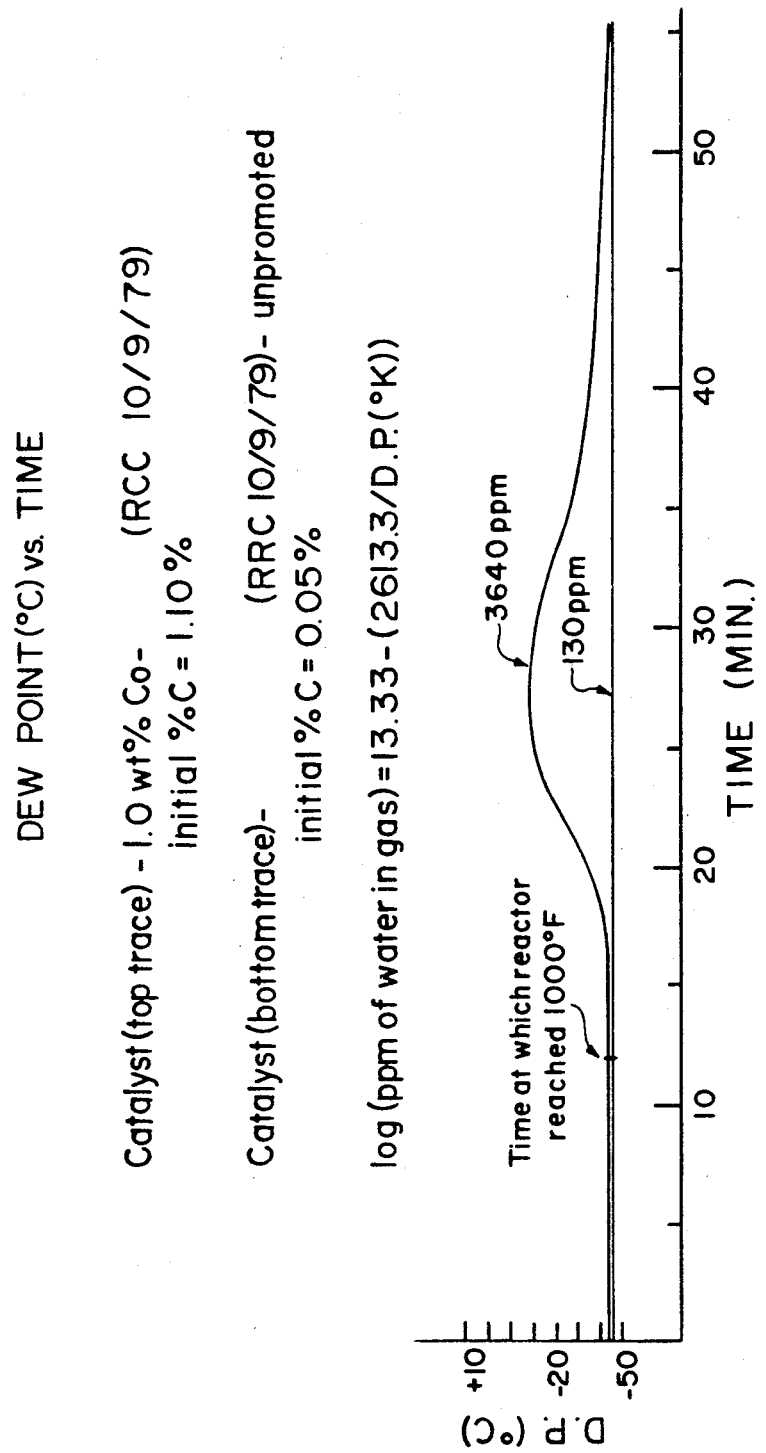
FIG. 5 is a graph showing the reaction of hydrogen in the coke with carbon dioxide to form water.
Figure 6:
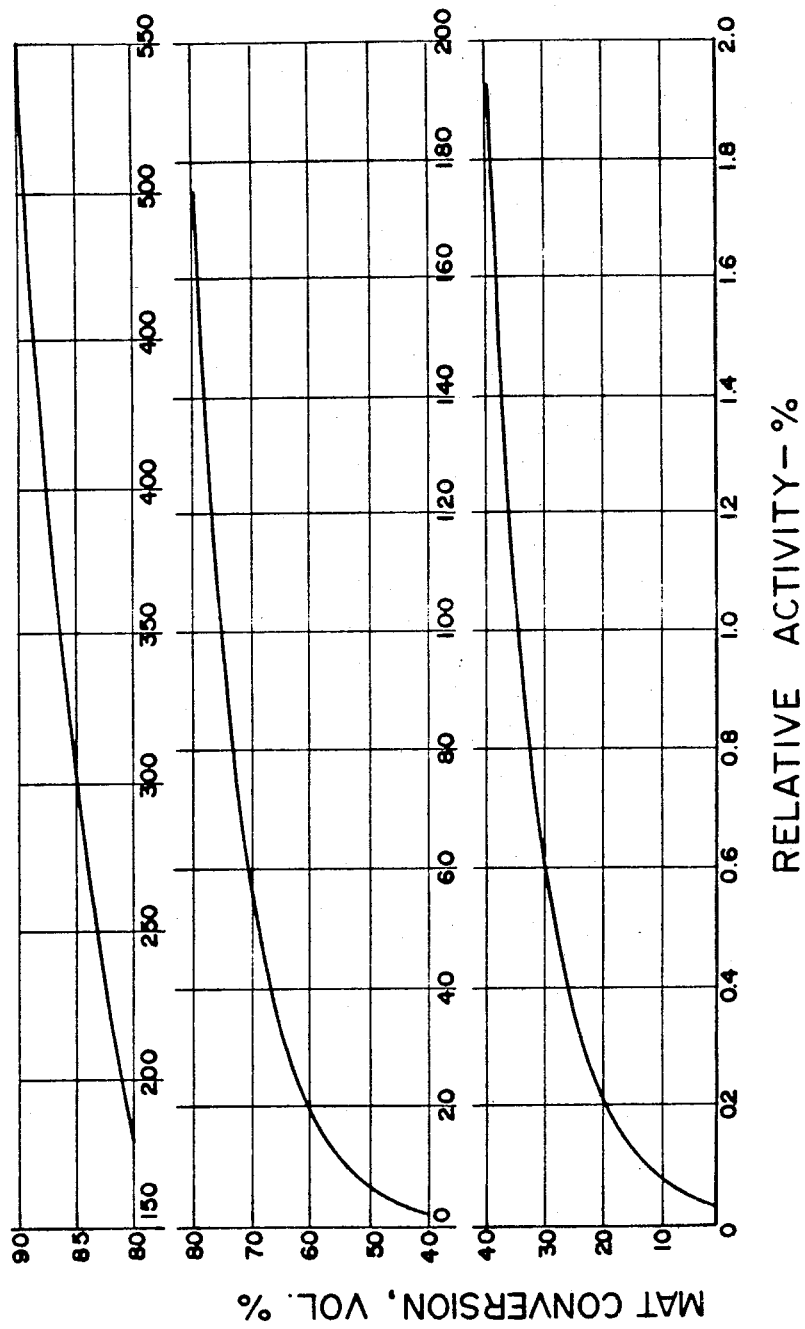
FIG. 6 is a graph showing the relationship of MAT volume % conversion to catalyst relative activity.

The hydrocarbonaceous material deposited on a RCC catalyst during reduced crude conversion has been analyzed on a C—H analyzer to contain 5-6 wt% hydrogen. Under typical combustion conditions in a regenerator used in a reduced crude cracking process, this amount of hydrogen can contribute up to 20-25% of the heat released during catalyst regeneration. Thus, it was postulated that the reaction of carbon dioxide with hydrogen present in the carbonaceous deposit to form water could be used to reduce the large amount of heat released by combustion of hydrogen with oxygen in exchange for a slight release of heat during this carbon dioxide reaction. Thus, the reduced heat of reaction of carbon dioxide with hydrogen becomes almost as important as the reaction of carbon dioxide with carbon. This reaction was studied in an apparatus similar to that outlined for the metal additive program. A suitable cracking catalyst containing 1.1 wt% C was placed in the reactor and heated from room temperature to 1400° F. in flowing helium. This was to determine and establish a baseline for moisture evaluation of the catalyst. It was found that the catalyst could not be heated to 1400° F. and then have carbon dioxide processed over it to determine water production because above 1000° F. the carbonaceous deposit is graphitized with loss of hydrogen. An identical catalyst containing 1.1 wt% coke and 1.0 wt% cobalt as the metal additive was processed with carbon dioxide being admitted at 300° F. and the water evolution measured. These results are shown graphically in FIG. 5. The amount of water produced and detected calculates back to 5 wt% of hydrogen in the carbonaceous deposit which corresponds to that determined on the C—H analyzer.

Metal Additives Deposited During Processing

An important aspect of this invention is the utilization of the metals deposited on a cracking catalyst used during carbon-metallic oil feed processing. The catalytic processing of a reduced crude containing 100 ppm Ni+V and a Conradson carbon value of 7-8 wt% provided catalyst samples withdrawn at different times in the cycle. This permitted a study of the effect of changing concentrations of Ni+V on the catalyst to catalyze the endothermic removal of carbon (C) by reaction with carbon dioxide to form carbon monoxide. The result of this series of tests are given in Table I.

TABLE I

RCC CRACKING CATALYST
TEST CONDITIONS: 20 g. catalyst; 1400° F.; 1.7 cu. ft. $CO_2$ per hr.

| Ni + V - ppm | Coke Removal - % |
|---|---|
| 500 | 22 |
| 5700 | 22 |
| 8100 | 38 |

These results show that at 5700 ppm Ni+V, a carbon removal rate of 22% is obtained which is found not rapid enough to treat feeds of high Conradson carbon levels. However, at about 8000 ppm, the rate is sufficient to handle higher Conradson carbon feed values of about 20 wt%. The lower carbon removal rates are not excluded because they are capable of handling crudes of lower Conradson carbon values and secondly, to obtain the higher metals loadings contributed by the reduced crude feed, fresh catalyst would accumulate metals through these lower ranges. Thus, the data of Table I is not considered adversely limiting but is considered to show a trend in the rate of carbon removal as metals accumulate from a specific Conradson carbon and metals contributing feed.

Industrial Applicability

The invention is useful in the catalytic conversion of hydrocarbon feeds processed in conventional FCC and RCC processes and the process described herein. The present invention is particularly useful in the catalytic cracking of high boiling carbo-metallic containing residual oil or reduced crude feedstocks to lower boiling hydrocarbon product fractions particularly in the liquid fuel range.

Although a catalytic cracking process for reduced crudes, etc. is preferably conducted in a riser reactor, other types of reactors with either upward or downward flow may be employed. Thus, the cracking operation may be conducted with a moving bed of catalyst which moves in cocurrent relationship to liquid (unvaporized) feedstock under suitable contact conditions of pressure, temperature and contact time or weight hourly space velocity. The high boiling liquid reduced crude feedstock may be processed in reactors comprising fixed beds of catalyst which are cycled between cracking and regeneration operation.

Although the preferred reduced crude conversion operation of this invention is a special catalytic cracking operation, the special catalyst and processes of the invention may be employed in combination with a number of various other types of hydrocarbon conversion operations, such as hydrotreating dehydrocyclization, hydrocracking, hydroforming of naphthene hydrocarbons and the like, polymerization of olefins, depolymerization of polymers, alkylation, dealkylation, disproportionation, reforming of naphthas, isomerization of paraffins and the like, aromatization of paraffins and the like, hydrogenation, dehydrogenation and various types of hydrofining operations in which one or more characteristics of the feedstock or product of reduced crude cracking are improved by treatment with hydrogen in the presence of a catalyst.

Having thus generally described the improved and novel concepts of the invention and discussed specific examples in support thereof, it is to be understood that no undue restrictions are to be imposed by reason thereof.

We claim:

1. In a process for regenerating a finely divided hydrocarbon cracking catalyst having deposited thereon a substantial quantity of hydrocarbonaceous coke by contacting said catalyst at an elevated temperature with a gas rich in carbon dioxide to endothermically convert said hydrocarbonaceous coke substantially to carbon monoxide and water; the improvement which consists essentially of:
   (a) heating said catalyst to a temperature in a range from about 1350° F. to about 1600° F.,
   (b) contacting said catalyst with said carbon dioxide rich gas for a time sufficient to endothermically convert a substantial portion of said hydrocarbonaceous coke to carbon monoxide and water while maintaining said catalyst at a temperature in the range of about 1250° F. to about 1600° F. throughout said contacting period, and
   (c) recovering said catalyst from step (b);
said catalyst being further characterized by having about 0.2 to 5.0 weight % copper deposited thereon by being impregnated with an aqueous solution of a water soluble copper salt.

2. A process of claim 1 in which at least 1 weight % of copper is deposited on the catalyst.

3. A process of claim 1 in which the finely divided hydrocarbon cracking catalyst is a mixture of a crystalline aluminosilicate zeolite dispersed in a matrix including one or more of a silica, an alumina, a silica-alumina or a clay, said catalyst having added thereto 0.2 to 5 weight % of copper.

4. A process of claim 1 in which titanium also is deposited on the cracking catalyst.

5. A continuous process for regenerating a finely divided hydrocarbon cracking catalyst having deposited thereon (1) about 0.2 to 5.0 weight % of copper, and (2) a substantial quantity of hydrocarbonaceous coke and recovering regenerated catalyst having a hydrocarbonaceous coke level sufficiently low so that the catalyst will efficiently crack a high-boiling hydrocarbon feed stock having a Conradson carbon content of at least about 6 weight % and less than 200 ppm of metals consisting of Ni, V, Fe, and Cu, said process consisting essentially of:
   (a) continuously introducing into a first catalyst regeneration zone finely divided hydrocarbon cracking catalyst having deposited thereon about 0.2 to 5.0 weight % of copper and a substantial quantity of hydrocarbonaceous coke, said catalyst having an introduction temperature of less than about 1100° F.,
   (b) contacting the catalyst in the first regeneration zone with an oxygen containing gas to partially burn the hydrocarbonaceous coke thereon,
   (c) maintaining the oxygen concentration and the catalyst contact time in the first regenerating zone so that the catalyst temperature is elevated to and maintained within a range of from about 1250° F. to about 1600° F.,
   (d) continuously transferring catalyst from said first regeneration zone to a second regeneration zone,
   (e) contacting the catalyst in the second regeneration zone with a carbon dioxide rich gas to convert the remainder of the hydrocarbonaceous coke on the catalyst substantially to carbon monoxide and water,
   (f) maintaining the carbon dioxide concentration and the contact time in the second regeneration zone so that the catalyst temperature therein is maintained within a range of from about 1250° F. to about 1600° F. and the hydrocarbonaceous coke on the catalyst is reduced to a level sufficiently low so that the regenerated catalyst will efficiently crack a high-boiling hydrocarbon feed stock having a Conradson carbon content of at least about 6 weight % and less than 200 ppm of metals consisting of Ni, V, Fe, and Cu, and (g) continuously recovering regenerated catalyst from said second regenerating zone;

said catalyst being further characterized by having the copper deposited thereon by being impregnated with an aqueous solution of a water soluble copper salt.

6. A process of claim 5 in which the temperature in the second catalyst regeneration zone is maintained at about 1350°–1450° F.

7. A process of claim 6 in which the oxygen-containing gas employed in the first catalyst regeneration zone is a mixture of oxygen and the flue gas from the second catalyst regeneration zone.

8. A process of claim 5 in which the finely divided hydrocarbon cracking catalyst is a mixture of a crystalline aluminosilicate zeolite dispersed in a matrix including one or more of a silica, an alumina, a silica-alumina or a clay, said catalyst having added thereto 0.2 to 5 weight % of copper.

9. A process of claim 5 in which titanium also is deposited on the cracking catalyst.

10. A continuous process for regenerating a finely divided hydrocarbon cracking catalyst having deposited thereon (1) about 0.2 to 5.0 weight % copper, and (2) a substantial quantity of hydrocarbonaceous coke and recovering regenerated catalyst having a hydrocarbonaceous coke level sufficiently low so that the catalyst will efficiently crack a high-boiling hydrocarbon feed stock having a Conradson carbon content of at least about 6 weight % and less than 200 ppm of metals consisting of Ni, V, Fe, and Cu, said process consisting essentially of:

(a) continuously withdrawing from a hydrocarbon cracking zone finely divided hydrocarbon cracking catalyst at a temperature of less than about 1100° F., said catalyst having deposited thereon about 0.2 to 5.0 weight % of copper and a substantial quantity of hydrocarbonaceous coke, (b) heating the catalyst withdrawn in step (a) to a temperature in a range from about 1250° F. to about 1600° F., (c) continuously transferring the heated catalyst from step (b) to a first regeneration zone, (d) contacting the catalyst in the first regeneration zone with a carbon dioxide-rich gas to convert a substantial portion of the hydrocarbonaceous coke on the catalyst substantially to carbon monoxide and water while maintaining the carbon dioxide concentration at a level such that the catalyst is maintained at a temperature in the range of from about 1250° F. to about 1600° F., (e) continuously transferring catalyst from said first regeneration zone to a second regeneration zone, (f) contacting the catalyst in the second regeneration zone with an oxygen containing gas to burn substantially the remainder of the hydrocarbonaceous coke on the catalyst, (g) maintaining the oxygen concentration and the contact time in the second regeneration zone so that the catalyst temperature therein is maintained within a range of from about 1250° F. to about 1600° F. and the hydrocarbonaceous coke on the catalyst is reduced to a level sufficiently low so that the regenerated catalyst will efficiently crack a high-boiling hydrocarbon feed stock having a Conradson carbon content of at least about 6 weight % and less than 200 ppm of metals consisting of Mi, V, Fe, and Cu, and (h) continuously recovering regenerated catalyst from said second regenerating zone;

said catalyst being further characterized by having the copper deposited thereon by being impregnated with an aqueous solution of a water soluble copper salt.

11. A process of claim 10 in which the temperature in both the first and the second catalyst regeneration zones is maintained at about 1350°–1450° F.

12. A process of claim 11 in which the carbon dioxide-containing gas introduced into the first catalyst regeneration zone also contains oxygen.

13. A process of claim 10 in which the finely divided hydrocarbon cracking catalyst is a mixture of a crystalline aluminosilicate zeolite dispersed in a matrix including one or more of a silica, an alumina, a silica-alumina or a clay, said catalyst having added thereto 0.2 to 5 weight % of copper.

14. A process of claim 10 in which titanium also is deposited on the cracking catalyst.

* * * * *